(12) United States Patent
Kashiwagi et al.

(10) Patent No.: US 9,618,763 B2
(45) Date of Patent: Apr. 11, 2017

(54) LIQUID CRYSTAL OPTICAL DEVICE AND IMAGE DISPLAY DEVICE

(71) Applicant: KABUSHIKI KAISHA TOSHIBA, Tokyo (JP)

(72) Inventors: Masako Kashiwagi, Kanagawa-ken (JP); Shinichi Uehara, Tokyo (JP); Ayako Takagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 14/196,579

(22) Filed: Mar. 4, 2014

(65) Prior Publication Data

US 2014/0340292 A1 Nov. 20, 2014

(30) Foreign Application Priority Data

May 16, 2013 (JP) ................. 2013-104456

(51) Int. Cl.
*G09G 3/36* (2006.01)
*G02F 1/1335* (2006.01)
(Continued)

(52) U.S. Cl.
CPC ......... *G02B 27/26* (2013.01); *G02B 27/2214* (2013.01); *G02F 1/29* (2013.01);
(Continued)

(58) Field of Classification Search
CPC .. G02B 27/06; G02B 27/2214; G09G 3/3696; H04N 13/0404; H04N 13/0413
(Continued)

(56) References Cited

U.S. PATENT DOCUMENTS 8,179,354 B2 * 5/2012 Chen ................. G02F 1/134336
345/98
8,223,290 B2 * 7/2012 Lee ................... G02F 1/133707
257/59

(Continued)

FOREIGN PATENT DOCUMENTS

JP 2007-226231 9/2007
JP 2010-249954 11/2010

OTHER PUBLICATIONS

European Search Report issued by the European Patent Office on Aug. 21, 2014, for European Patent Application No. 14157453.3.

*Primary Examiner* — Kwin Xie
(74) *Attorney, Agent, or Firm* — Finnegan, Henderson, Farabow, Garrett & Dunner LLP

(57) ABSTRACT

According to one embodiment, a liquid crystal optical device includes first and second substrate units and a liquid crystal layer. The first substrate unit includes a first substrate having a first surface and a first side extending in a first side direction, and first electrodes provided on the first surface. The second substrate unit includes a second substrate having a second surface, and second electrodes provided on the second surface. The liquid crystal layer includes liquid crystal molecules provided between the first and second substrate units. A first angle in a first rotation direction from the first side direction to the first direction is less than 90 degrees and more than 0 degrees. A second angle in the first rotation direction is different from the first angle. A third angle in the first rotation direction is different from the first and second angles.

20 Claims, 13 Drawing Sheets

(51) Int. Cl.
  *H04N 13/04*   (2006.01)
  *G02B 27/26*   (2006.01)
  *G02F 1/29*   (2006.01)
  *G02B 27/22*   (2006.01)

(52) U.S. Cl.
  CPC ....... *G09G 3/3696* (2013.01); *H04N 13/0404* (2013.01); *H04N 13/0454* (2013.01)

(58) Field of Classification Search
  USPC .................................................. 345/87–104
  See application file for complete search history.

(56)                References Cited

U.S. PATENT DOCUMENTS

| | | | |
|---|---|---|---|
| 2008/0062358 A1* | 3/2008 | Lee ................... | G02F 1/134309 349/103 |
| 2010/0157181 A1 | 6/2010 | Takahashi | |
| 2010/0259697 A1 | 10/2010 | Sakamoto et al. | |
| 2013/0002970 A1* | 1/2013 | Baek et al. ........................ | 349/5 |
| 2013/0342664 A1* | 12/2013 | Smith et al. .................... | 348/58 |

\* cited by examiner

LIQUID CRYSTAL OPTICAL DEVICE AND IMAGE DISPLAY DEVICE

CROSS-REFERENCE TO RELATED APPLICATIONS

This application is based upon and claims the benefit of priority from Japanese Patent Application No. 2013-104456, filed on May 16, 2013; the entire contents of which are incorporated herein by reference.

FIELD

Embodiments described herein relate generally to a liquid crystal optical device and an image display device.

BACKGROUND

There is a liquid crystal optical device that changes the distribution of the refractive index according to an applied voltage by utilizing the birefringence of a liquid crystal. There is a stereoscopic image display device in which such a liquid crystal optical device is combined with an image display unit.

For example, by changing the distribution of the refractive index of the liquid crystal optical device, such an image display device switches between a state in which the image displayed by the image display unit is caused to be incident on the eyes of a viewer as displayed by the image display unit and a state in which the image displayed by the image display unit is caused to be incident on the eyes of the viewer as multiple parallax images. Thereby, a high definition two-dimensional image display operation and a three-dimensional image display operation are performed, where the three-dimensional image display operation includes stereoscopic viewing with the naked eyes due to the multiple parallax images. A liquid crystal optical device and an image display device that are easier to use are desirable.

DETAILED DESCRIPTION

Figure 1:
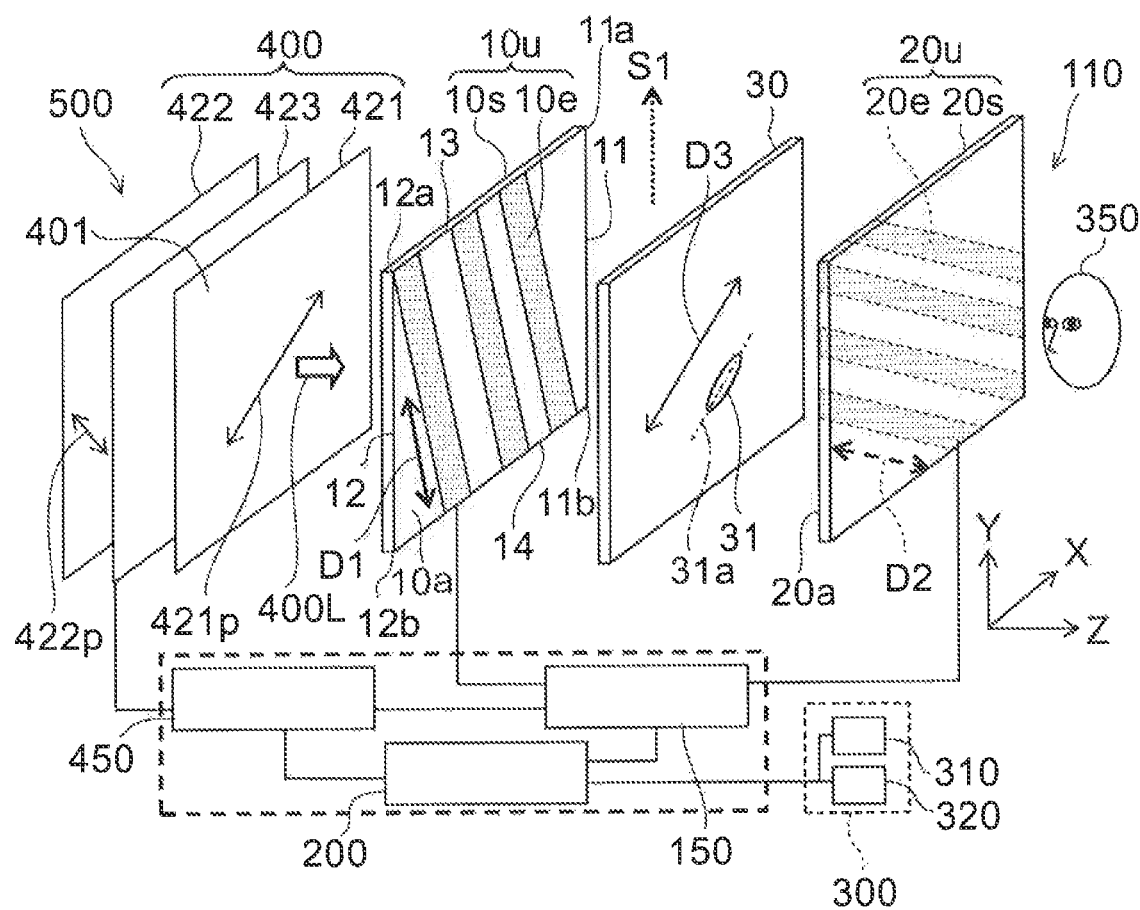
FIG. 1 is a schematic view showing a liquid crystal optical device and an image display device according to a first embodiment.

According to one embodiment, a liquid crystal optical device includes a first substrate unit, a second substrate unit and a liquid crystal layer. The first substrate unit includes a first substrate having a first surface and a first side, the first side extending in a first side direction when projected onto a plane parallel to the first surface, the first substrate being light-transmissive, and a plurality of first electrodes provided on the first surface to extend in a first direction to be separated from each other in a direction intersecting the first direction. The second substrate unit includes a second substrate having a second surface opposing the first surface, the second substrate being light-transmissive, and a plurality of second electrodes provided on the second surface to extend in a second direction to be separated from each other in a direction intersecting the second direction. The liquid crystal layer includes liquid crystal molecules provided between the first substrate unit and the second substrate unit. A first angle in a first rotation direction from the first side direction to the first direction is less than 90 degrees and more than 0 degrees. A second angle in the first rotation direction from the first side direction to a direction of the second direction when projected onto the plane is different from the first angle, less than 90 degrees, and more than 0 degrees. A third angle in the first rotation direction from the first side direction to a direction of a long-axis direction of the liquid crystal molecules when projected onto the plane is different from the first angle and different from the second angle.

According to one embodiment, an image display device includes a liquid crystal optical device and an image display unit stacked with the liquid crystal optical device. The liquid crystal optical device includes a first substrate unit, a second substrate unit and a liquid crystal layer. The first substrate unit includes a first substrate having a first surface and a first side, the first side extending in a first side direction when projected onto a plane parallel to the first surface, the first substrate being light-transmissive, and a plurality of first electrodes provided on the first surface to extend in a first direction to be separated from each other in a direction intersecting the first direction. The second substrate unit includes a second substrate having a second surface opposing the first surface, the second substrate being light-transmissive, and a plurality of second electrodes provided on the second surface to extend in a second direction to be separated from each other in a direction intersecting the second direction. The liquid crystal layer includes liquid crystal molecules provided between the first substrate unit and the second substrate unit. A first angle in a first rotation direction from the first side direction to the first direction is less than 90 degrees and more than 0 degrees. A second angle in the first rotation direction from the first side direction to a direction of the second direction when projected onto the plane is different from the first angle, less than 90 degrees, and more than 0 degrees. A third angle in the first rotation direction from the first side direction to a direction of a long-axis direction of the liquid crystal molecules when projected onto the plane is different from the first angle and different from the second angle. The image display unit is configured to cause light including image information to be incident on the liquid crystal layer.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic view illustrating a liquid crystal optical device and an image display device according to a first embodiment.

As shown in FIG. 1, the image display device 500 includes the liquid crystal optical device 110 and an image display unit 400. In the example, a first drive unit 150 for the liquid crystal optical device 110, a second drive unit 450 for the image display unit 400, and a sensor 300 are provided.

The liquid crystal optical device 110 includes a first substrate unit 10u, a second substrate unit 20u, and a liquid crystal layer 30.

The first substrate unit 10u includes a first substrate 10s and multiple first electrodes 10e. The first substrate 10s is light-transmissive. The first substrate 10s has a first surface 10a. The first surface 10a is a major surface of the first substrate 10s.

A direction perpendicular to the first surface 10a is taken as a Z-axis direction. One direction perpendicular to the Z-axis direction is taken as an X-axis direction. A direction perpendicular to the Z-axis direction and the X-axis direction is taken as a Y-axis direction. The first surface 10a is parallel to the X-Y plane.

In the example, the planar configuration of the first substrate 10s is substantially a rectangle (including a square). The first substrate 10s has first to fourth sides 11 to 14. The first side 11 extends in a first side direction S1. The first side direction S1 is taken as a Y-axis direction.

The first side 11 extends in the first side direction S1 (in the example, the Y-axis direction) when projected onto a plane (the X-Y plane) parallel to the first surface 10a. The first side 11 has one end 11a and one other end 11b. The one other end 11b is separated from the one end 11a in the Y-axis direction.

The second side 12 extends in the Y-axis direction to be separated from the first side 11 in the X-axis direction. The second side 12 has one end 12a and one other end 12b. The one other end 12b is separated from the one end 12a in the Y-axis direction.

The third side 13 connects the one end 11a of the first side 11 to the one end 12a of the second side 12. The third side 13 extends in the X-axis direction.

The fourth side 14 connects the one other end 11b of the first side 11 to the one other end 12b of the second side 12.

The fourth side 14 extends in the X-axis direction to be separated from the third side 13 in the Y-axis direction.

In the embodiment, each corner portion where the sides connect may be tilted with respect to each of the sides. The corner portion may have a curved configuration. In the embodiment, the configuration of the first substrate 10s may not be a rectangle (including a square) and may be any polygon. The first substrate 10s has at least the first side 11 extending in the first side direction S1.

The multiple first electrodes 10e are provided on the first surface 10a. Each of the multiple first electrodes 10e extends in a first direction D1. The multiple first electrodes 10e are separated from each other in a direction that intersects (e.g., is orthogonal to) the first direction D1. At least a portion of each of the multiple first electrodes 10e is, for example, light-transmissive. The first electrodes 10e have band configurations extending in the first direction D1.

The second substrate unit 20u includes a second substrate 20s and multiple second electrodes 20e. The second substrate 20s is light-transmissive. The second substrate 20s has a second surface 20a. The second surface 20a opposes the first surface 10a.

In the specification of the application, the state of being opposed includes the state of directly facing each other and the state of facing each other with another component inserted therebetween.

The second surface 20a is substantially parallel to the first surface 10a. The multiple second electrodes 20e are provided on the second surface 20a. The multiple second electrodes 20e extend in a second direction D2. The multiple second electrodes 20e are separated from each other in a direction intersecting (e.g., orthogonal to) the second direction D2. At least a portion of each of the multiple second electrodes 20e is, for example, light-transmissive. The second direction D2 intersects the first direction D1. In other words, the second direction D2 is non-parallel to the first direction D1.

The liquid crystal layer 30 is provided between the first substrate unit 10u and the second substrate unit 20u. The liquid crystal layer 30 includes liquid crystal molecules 31. The liquid crystal layer 30 includes, for example, a nematic liquid crystal. The liquid crystal layer 30 may include a chiral agent. The liquid crystal molecules 31 have a long-axis direction 31a.

The first side direction S1, the first direction D1, the second direction D2, and the alignment direction of the liquid crystal of the liquid crystal layer 30 are described below.

The first substrate 10s and the second substrate 20s include, for example, transparent glass, a transparent resin, etc. The first electrode 10e and the second electrode 20e include, for example, an oxide including at least one element selected from the group consisting of In, Sn, Zn, and Ti. The first electrode 10e and the second electrode 20e may include, for example, ITO (Indium Tin Oxide), etc. The first electrode 10e and the second electrode 20e may include, for example, thin metal layers that are light-transmissive.

In the image display device 500, such a liquid crystal optical device 110 is stacked with the image display unit 400. In other words, the image display unit 400 is stacked with the liquid crystal optical device 110. For example, the image display unit 400 has a display surface 401. The liquid crystal optical device 110 is stacked with the display surface 401 of the image display unit 400.

In the specification of the application, the state of being stacked includes the state of directly overlapping and the state of overlapping with another component inserted therebetween.

The display surface 401 is substantially parallel to the X-Y plane.

The image display unit 400 includes a display layer 423. In the example, the image display unit 400 includes, for example, a liquid crystal display device. In such a case, the display layer 423 includes a liquid crystal layer. For example, the image display unit 400 further includes a first polarizing layer 421 and a second polarizing layer 422. The display layer 423 is provided between the first polarizing layer 421 and the second polarizing layer 422. The first polarizing layer 421 and the second polarizing layer 422 include, for example, polarizing plates, polarizing films, polarizing filters, etc. The first polarizing layer 421 has a first transmission axis 421p. The first transmission axis 421p is an axis perpendicular to the absorption axis of the first polarizing layer 421 (the extension direction of the first polarizing layer 421). The second polarizing layer 422 has a second transmission axis 422p. The second transmission axis 422p is an axis perpendicular to the absorption axis of the second polarizing layer 422 (the extension direction of the second polarizing layer 422).

In the example, the display layer 423 is disposed between the second polarizing layer 422 and the liquid crystal optical device 110; and the first polarizing layer 421 is disposed between the display layer 423 and the liquid crystal optical device 110. Light (image light 400L) that is emitted from the image display unit 400 is incident on the liquid crystal optical device 110 from the first polarizing layer 421. The polarizing axis of the image light 400L emitted from the image display unit 400 is substantially parallel to the first transmission axis 421p of the first polarizing layer 421.

For example, the image light 400L is substantially linearly polarized light. The component of the vibration plane (the vibration plane of the electric field) along the polarizing axis of the image light 400L is greater than the component of the vibration plane (the vibration plane of the electric field) along an axis orthogonal to the polarizing axis of the image light 400L.

The configuration of the image display unit 400 is arbitrary. Any configuration is applicable to the display layer 423 such as, for example, a VA mode, a TN mode, an IPS mode, etc. A phase difference layer (a phase difference plate) may be provided between the first polarizing layer 421 and the display layer 423 and/or between the second polarizing layer 422 and the display layer 423.

In the example, the operation of the display layer 423 is controlled by the second drive unit 450 for the image display unit 400. The second drive unit 450 is connected to the display layer 423 that forms light including image information. An image signal is input to the second drive unit 450 by, for example, a recording medium, an external input, etc. The second drive unit 450 controls the operation of the image display unit 400 based on the image signal that is input. Multiple pixels (not shown) are provided in the display layer 423. An image is formed by controlling the alignment of the liquid crystal of the multiple pixels to modulate the intensity of the light that is emitted from the multiple pixels. The light (the image light 400L) that includes the image is incident on the liquid crystal optical device 110.

In the example, the first drive unit 150 for the liquid crystal optical device 110 is electrically connected to the multiple first electrodes 10e and the multiple second electrodes 20e of the liquid crystal optical device 110. The alignment of the liquid crystal of the liquid crystal layer 30 changes according to the voltage applied between the first electrode 10e and the second electrode 20e. As described below, multiple lenses that extend in the X-Y plane are formed in the liquid crystal layer 30.

For example, a refractive index distribution (a change of the refractive index) is formed in a direction orthogonal to the first direction D1 which is the extension direction of the first electrodes 10e according to the voltage supplied from the first drive unit 150. In other words, for example, a lens having multiple band configurations (e.g., a lens having cylindrical configurations) aligned in the first direction D1 is formed in a first electrode state. Or, a refractive index distribution is formed in a direction orthogonal to the second direction D2 which is the extension direction of the second electrodes 20e. In other words, a lens having multiple band configurations (e.g., a lens having cylindrical configurations) aligned in the second direction D2 is formed in a second electrode state. The second direction D2 intersects the first direction D1. By changing the electrode states, multiple refractive index distributions that extend in multiple mutually-different directions can be formed.

As illustrated in FIG. 1, the second drive unit 450 for the image display unit 400 and the first drive unit 150 for the liquid crystal optical device 110 may be integrated and included in a controller 200.

The light (the image light 400L) that includes the image emitted from the image display unit 400 is incident on the liquid crystal optical device 110; and, for example, three-dimensional image display operations of stereoscopic viewing are performed in the liquid crystal optical device 110 by the refractive index distributions recited above. The operations are described below. The sensor 300 also is described below.

Figure 2:
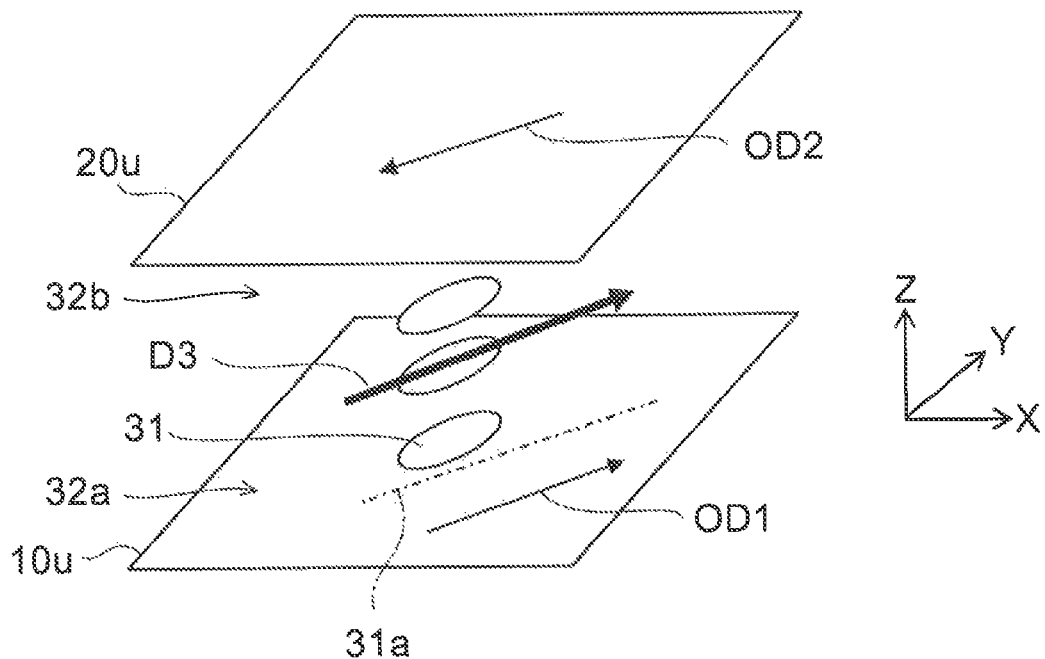
FIG. 2 is a schematic perspective view showing the liquid crystal optical device according to the first embodiment.

FIG. 2 is a schematic perspective view illustrating the liquid crystal optical device according to the first embodiment.

FIG. 2 illustrates the state of the liquid crystal molecules 31 of the liquid crystal layer 30.

As illustrated in FIG. 2, the liquid crystal layer 30 is provided between the first substrate unit 10u and the second substrate unit 20u. For example, the liquid crystal molecules 31 of the liquid crystal layer 30 are aligned in a prescribed direction. For example, a not-shown alignment film is provided on the surface of the first substrate unit 10u (e.g., the surface of the first electrode 10e) opposing the liquid crystal layer 30. On the other hand, a not-shown alignment film is provided on the surface of the second substrate unit 20u (e.g., the surface of the second electrode 20e) opposing the liquid crystal layer 30. Alignment processing (e.g., rubbing, etc.) of these alignment films is performed. Thereby, the alignment of the liquid crystal molecules 31 of the liquid crystal layer 30 is determined.

The direction of the long-axis direction 31a (the direction of the director) of the liquid crystal molecules 31 of the liquid crystal layer 30 when projected onto the X-Y plane is taken as a third direction D3.

In the example shown in FIG. 2, the alignment of the liquid crystal molecules 31 is controlled by the rubbing.

For example, the liquid crystal layer 30 has a first substrate side portion 32a contacting the first substrate unit 10u and a second substrate side portion 32b contacting the second substrate unit 20u. The first substrate side portion 32a has a first alignment direction OD1. The second substrate side portion 32b has a second alignment direction OD2.

The first alignment direction OD1 is, for example, the alignment direction (e.g., the rubbing direction) of the first substrate unit 10u. The second alignment direction OD2 is, for example, the alignment direction (e.g., the rubbing direction) of the second substrate unit 20u.

The long-axis direction 31a of the liquid crystal molecules 31 of the liquid crystal layer 30 includes the first alignment direction OD1 of the first substrate side portion 32a of the liquid crystal layer 30 and the second alignment direction OD2 of the second substrate side portion 32b of the liquid crystal layer 30.

In the example shown in FIG. 2, the first alignment direction OD1 is antiparallel (reversely oriented) to the second alignment direction OD2. For example, the liquid crystal layer 30 has a uniaxial alignment. For example, the absolute value of the angle between the first alignment direction OD1 and the second alignment direction OD2 may be less than 3 degrees.

In such a case, a substantially homogeneous alignment is formed in the liquid crystal layer 30. In such a case, the first alignment direction OD1 and the second alignment direction OD2 are substantially parallel to the third direction D3.

The liquid crystal layer 30 includes, for example, a nematic liquid crystal. The dielectric anisotropy of the liquid crystal included in the liquid crystal layer 30 is, for example, positive. The state in which a voltage is not applied to the liquid crystal layer 30 (or, in the case where the liquid crystal layer 30 has a threshold voltage, the state in which a voltage that is not more than the threshold voltage is applied) is a non-activated state. The state in which a voltage (a voltage larger than the threshold voltage) is applied to the liquid crystal layer 30 is an activated state. For example, in the non-activated state, the liquid crystal layer 30 has a substantially horizontal alignment. In this state, the direction of the long-axis direction 31a of the liquid crystal molecules 31 when projected onto the X-Y plane corresponds to the third direction D3. In the case where the dielectric anisotropy of the liquid crystal included in the liquid crystal layer 30 is positive, the pretilt angle of the liquid crystal (the angle between the director and the major surface of the substrate) in the non-activated state is, for example, not less than 0 degrees and not more than 30 degrees. In such a case, the alignment of the liquid crystal is substantially, for example, a horizontal alignment or a HAN alignment.

The dielectric anisotropy of the liquid crystal included in the liquid crystal layer 30 may be negative. For example, in the activated state in which the voltage (the voltage larger than the threshold voltage) is applied to the liquid crystal layer 30, the long-axis direction 31a of the liquid crystal molecules 31 of the liquid crystal layer 30 has a component parallel to the X-Y plane. In this state, the direction of the long-axis direction 31a of the liquid crystal molecules 31 when projected onto the X-Y plane corresponds to the third direction D3. In the case where the dielectric anisotropy of the liquid crystal is negative, the pretilt angle of the liquid crystal in the non-activated state is, for example, not less than 60 degrees and not more than 90 degrees. In such a case, the alignment of the liquid crystal is substantially, for example, a vertical alignment or a HAN alignment.

For example, the third direction D3 can be determined by evaluating the optical characteristics of the liquid crystal layer 30 including polarized light. The third direction D3 may be determined by the alignment control direction (e.g., the rubbing direction) of the liquid crystal molecules 31 of the liquid crystal layer 30. The rubbing direction can be determined by observing the anisotropy of the nonuniformity (e.g., the rubbing scratches, etc.) of the alignment of the liquid crystal layer 30 that occurs when a voltage (particularly a direct-current voltage) is applied to the liquid crystal layer 30. The liquid crystal alignment of the liquid crystal layer 30 may be formed by a photo-alignment method, etc., and may be formed by any method.

In the case where the liquid crystal alignment of the liquid crystal layer 30 is not a twist alignment, the first alignment direction OD1 is parallel to the second alignment direction OD2. In the case where the liquid crystal alignment of the liquid crystal layer 30 is not a twist alignment, the third direction D3 corresponds to the alignment direction (the first alignment direction OD1) of the liquid crystal on the first substrate unit 10u.

As described below, a twist alignment may be used as the alignment of the liquid crystal layer 30. For example, the long-axis direction 31a of the liquid crystal (the liquid crystal molecules 31) twists around the axis of the Z-axis direction. At this time, the third direction D3 changes inside the liquid crystal layer 30. To simplify the description hereinbelow, the case is described where the alignment direction of the liquid crystal is constant along the Z axis.

Figure 3A:
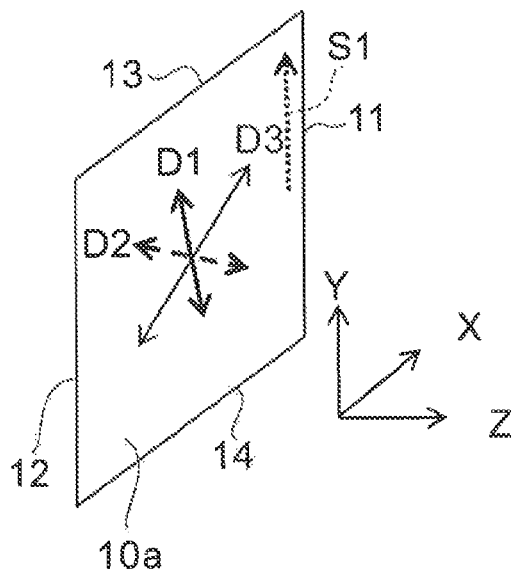
FIG. 3A and FIG. 3B are schematic views showing the liquid crystal optical device according to the first embodiment.
Figure 3B:
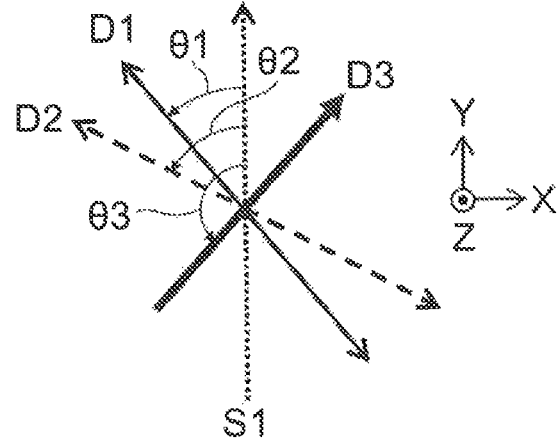

FIG. 3A and FIG. 3B are schematic views illustrating the liquid crystal optical device according to the first embodiment.

FIG. 3A is a schematic perspective view; and FIG. 3B is a schematic plan view.

As illustrated in FIG. 3A, the first side 11 extends in the first side direction S1 when projected onto the plane (the X-Y plane) parallel to the first surface 10a of the first substrate 10s. The first side direction S1 is, for example, parallel to the Y-axis direction.

The first direction D1 and the first side direction S1 are directions in the plane (the X-Y plane) recited above. The second direction D2 and the third direction D3 can be projected onto the plane (the X-Y plane) recited above.

FIG. 3B illustrates the first direction D1 and the first side direction S1 in the X-Y plane and the second direction D2 and the third direction D3 when projected onto the X-Y plane.

As shown in FIG. 3B, the angle in the first rotation direction from the first side direction S1 to the first direction D1 is a first angle θ1. The first angle θ1 is less than 90 degrees and more than 0 degrees. In the example, the first rotation direction is counterclockwise. As described below, the first rotation direction may be clockwise. Hereinbelow, the case is described where the first rotation direction is counterclockwise.

On the other hand, the angle in the first rotation direction (in the example, counterclockwise) from the first side direction S1 to the direction of the second direction D2 when projected onto the X-Y plane is a second angle θ2. The second angle θ2 is different from the first angle θ1. The second angle 82 is less than 90 degrees and more than 0 degrees. In the example, the second angle θ2 is larger than the first angle θ1. As described below, the second angle θ2 may be smaller than the first angle θ1.

On the other hand, the angle in the first rotation direction (in the example, counterclockwise) from the first side direction S1 to the third direction D3 (i.e., the direction of the long-axis direction 31a of the liquid crystal molecules 31 when projected onto the X-Y plane) is a third angle θ3. The third angle θ3 is different from the first angle θ1 and different from the second angle θ2. In the example, the third angle θ3 is larger than the first angle θ1 and larger than the second angle θ2.

Thus, in the embodiment, the third direction D3 intersects the first direction D1 and intersects the second direction D2. The third direction D3 is positioned, for example, inside the obtuse angle formed by the first direction D1 and the second direction D2.

By such a first side direction S1, first direction D1, second direction D2, and third direction D3, as described below, for example, it is possible to obtain and switch between a refractive index distribution in a direction orthogonal to the first direction D1 and a refractive index distribution in a direction orthogonal to the second direction D2. Thereby, a liquid crystal optical device and an image display device that are easier to use are obtained.

For example, as an example of operating states, a first operating state of forming the refractive index distribution in the direction orthogonal to the first direction D1 and the second operating state of forming the refractive index distribution in the direction orthogonal to the second direction D2 will be described. Hereinbelow, the case is described where the liquid crystal of the liquid crystal layer 30 has positive dielectric anisotropy.

Figure 4A:
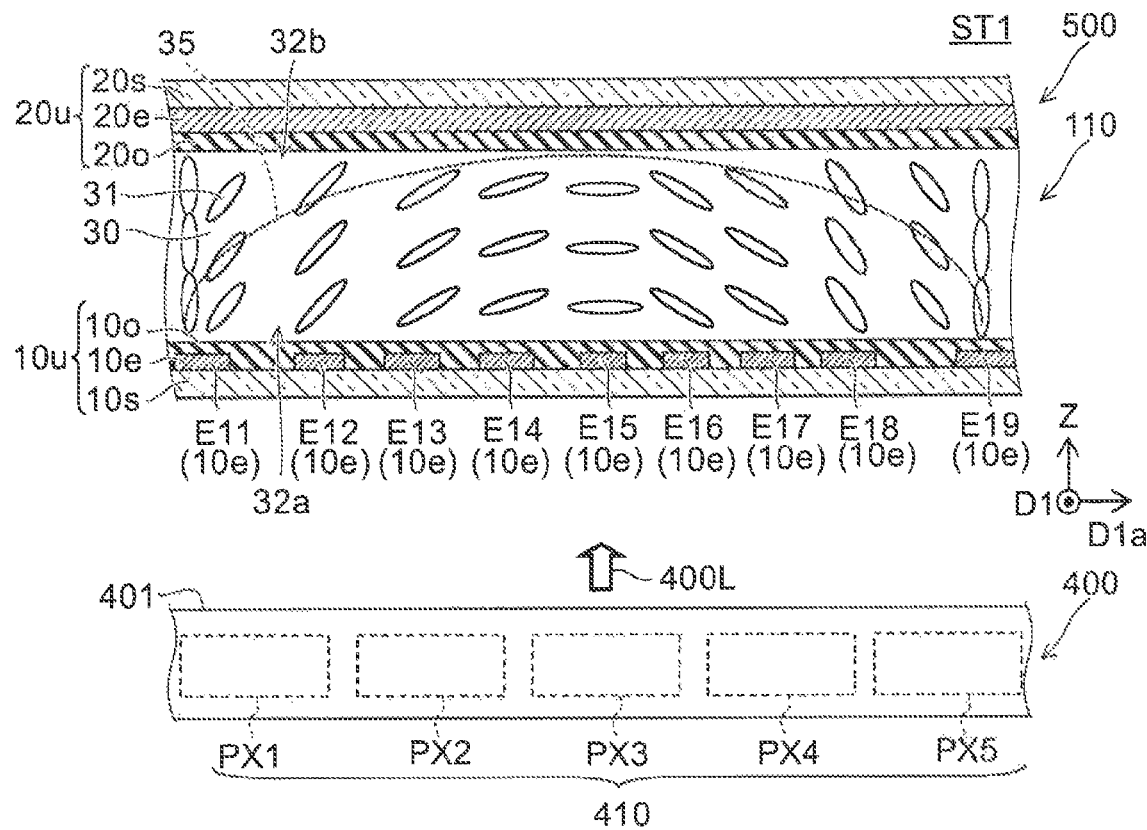
FIG. 4A and FIG. 4B are schematic views showing an operation of the liquid crystal optical device and the image display device according to the first embodiment.
Figure 4B:
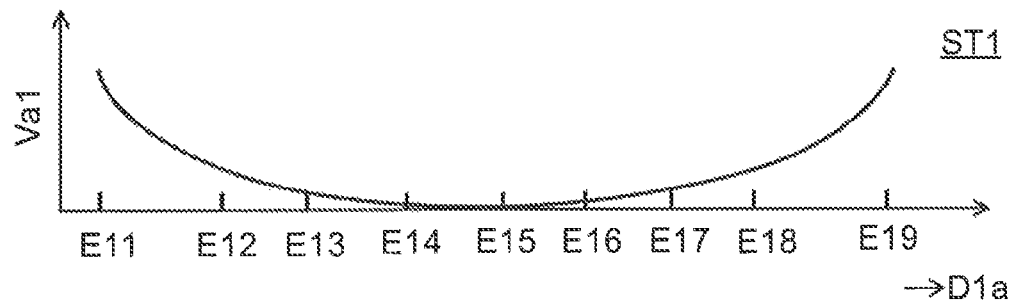

FIG. 4A and FIG. 4B are schematic views illustrating an operation of the liquid crystal optical device and the image display device according to the first embodiment.

FIG. 4A illustrates the liquid crystal optical device 110 and the image display device 500 in a first operating state ST1.

FIG. 4A is a schematic cross-sectional view when the liquid crystal optical device 110 and the image display device 500 are cut by a plane including the Z-axis direction and a direction D1a that is perpendicular to the first direction D1 and perpendicular to the Z-axis direction. FIG. 4B illustrates a voltage Va1 supplied to the first electrode 10e in the first operating state ST1.

In the liquid crystal optical device 110 as shown in FIG. 4A, the first substrate unit 10u further includes a first alignment film 10o. The first alignment film 10o is provided between the first electrode 10e and the liquid crystal layer 30. In the example, the first alignment film 10o also is provided between the first substrate 10s and the liquid crystal layer 30. On the other hand, the second substrate unit 20u further includes a second alignment film 20o. The second alignment film 20o is provided between the second electrode 20e and the liquid crystal layer 30. The initial alignment of the liquid crystal layer 30 is formed by performing a prescribed processing of these alignment films. Thereby, the third direction D3 is determined. The first alignment film 10o and the second alignment film 20o include, for example, a resin such as polyimide, etc. The thicknesses of the first alignment film 10o and the second alignment film 20o are, for example, about 200 nm (e.g., not less than 100 nm and not more than 300 nm).

A refractive index distribution can be formed inside the liquid crystal layer 30 by controlling the voltage between the first electrodes 10e and the second electrodes 20e to control the alignment of the liquid crystal layer 30. To simplify the description hereinbelow, the potentials of the multiple second electrodes 20e in the first operating state ST1 are taken to be fixed. For example, the potentials of the multiple second electrodes 20e are set to be a ground potential.

On the other hand, mutually-different voltages are applied to the multiple first electrodes 10e. For example, the first electrodes 10e include electrodes E11 to E19. The electrodes E11 to E19 are arranged in the direction Da in this order. For example, mutually-different voltages are applied respectively to the electrodes E11 to E19.

The horizontal axis of FIG. 4B is the position in the direction Da. The vertical axis of FIG. 4B is the voltage Va1 applied to the first electrodes 10e. As shown in FIG. 4B, for example, a high voltage is applied to the electrode E11 and the electrode E19. On the other hand, a low voltage is applied to the electrode E15. For example, the potential of the electrode E15 is set to be the same as the potential of the second electrodes 20e. The voltage is set to decrease for the electrodes E12, E13, and E14 in this order. On the other hand, the voltage is set to increase for the electrodes E16, E17, and E18 in this order.

The alignment of the liquid crystal layer 30 is determined by the elastic energy and the inductive energy due to the voltage applied to the liquid crystal layer 30.

By applying such a voltage, a high voltage is applied to the liquid crystal layer 30 between the second electrodes 20e and the electrodes E11 and E19. Therefore, as illustrated in FIG. 4A, the angle between the Z-axis direction and the long axis of the liquid crystal molecules 31 at these portions is small. In other words, the tilt angle is large. On the other hand, the voltage applied to the liquid crystal layer 30 between the electrode E15 and the second electrode 20e is low (e.g., 0). The angle between the Z-axis direction and the long axis of the liquid crystal molecules 31 at this portion is large. In other words, the tilt angle is small. States that are intermediate between the large tilt angle and the small tilt angle are formed in the region between the electrode E11 and the electrode E15 and in the region between the electrode E19 and the electrode E15. Thus, the first electrode state is formed by the first drive unit 150; and the first alignment state of the liquid crystal is formed by the first electrode state.

The liquid crystal has birefringence. The refractive index for polarized light in the long-axis direction 31a of the liquid crystal molecules 31 is higher than the refractive index in the short-axis direction of the liquid crystal molecules 31. The alignment direction of the liquid crystal of the liquid crystal layer 30 changes according to the applied voltage; and the effective refractive index changes according to the change of the alignment direction. Thereby, a refractive index distribution (a first refractive index distribution 35) is formed in the liquid crystal layer 30. In other words, a first lens is formed. The refractive index of the first refractive index distribution 35 (the first lens) changes along the direction Da. Then, the refractive index along the first direction D1 is substantially constant. For example, the first lens is formed in a lenticular configuration.

Such electrodes E11 to E19 are used as one set. The set is multiply provided; and the multiple sets are arranged along the direction Da. Thereby, the first lens is multiply provided. For example, multiple cylindrical lenses extending along the first direction D1 are arranged along the direction D1a orthogonal to the first direction D1.

For example, the position corresponding to the electrode E11 and the position corresponding to the electrode E19 correspond to the lens ends. The position corresponding to the electrode E15 corresponds to the lens center.

Thus, in the first operating state ST1, the first refractive index distribution 35 (the first lens) is formed along the direction D1a that is perpendicular to the first direction D1 and perpendicular to the Z-axis direction. The liquid crystal optical device 110 functions as, for example, a liquid crystal GRIN lens (Gradient Index lens). FIG. 4A illustrates one liquid crystal GRIN lens. Such a lens is multiply formed along the direction D1a.

In such a case, the image display unit 400 includes, for example, multiple pixel groups 410 (e.g., first to fifth pixels PX1 to PX5, etc.). The multiple pixel groups 410 are arranged, for example, in a matrix configuration in the plane (e.g., the X-Y plane) parallel to the display surface 401. Multiple parallax images are displayed by the multiple pixel groups 410. The multiple parallax images are, for example, images corresponding to the parallax of the viewer. The light (the image light 400L) that includes the multiple parallax images is incident on the liquid crystal optical device 110.

As described above, the first substrate 10s, the second substrate 20s, the first electrodes 10e, and the second electrodes 20e are light-transmissive. The image light 400L that is emitted from the image display unit 400 passes through the first substrate 10s, the second substrate 20s, the first electrodes 10e, and the second electrodes 20e. A three-dimensional image is perceived by viewing the image light 400L including the multiple parallax images via the first refractive index distribution 35 (the first lens) formed in the liquid crystal optical device 110.

In other words, the multiple parallax images that are formed of the pixel groups 410 of the image display unit 400 by the lenses having the lenticular configurations formed in the liquid crystal optical device 110 are selectively incident on the right eye or the left eye of the viewer. Thereby, the three-dimensional image is perceived.

Thus, in the first operating state ST1, a first three-dimensional image that utilizes the first refractive index distribution 35 (the first lens) along the direction D1a perpendicular to the first direction D1 can be displayed.

On the other hand, in the case where the voltage is not applied to the liquid crystal layer 30, the refractive index of the liquid crystal layer 30 is constant. At this time, the display image of the image display unit 400 is an image without parallax. Thereby, a high definition two-dimensional image is provided.

Figure 5A:
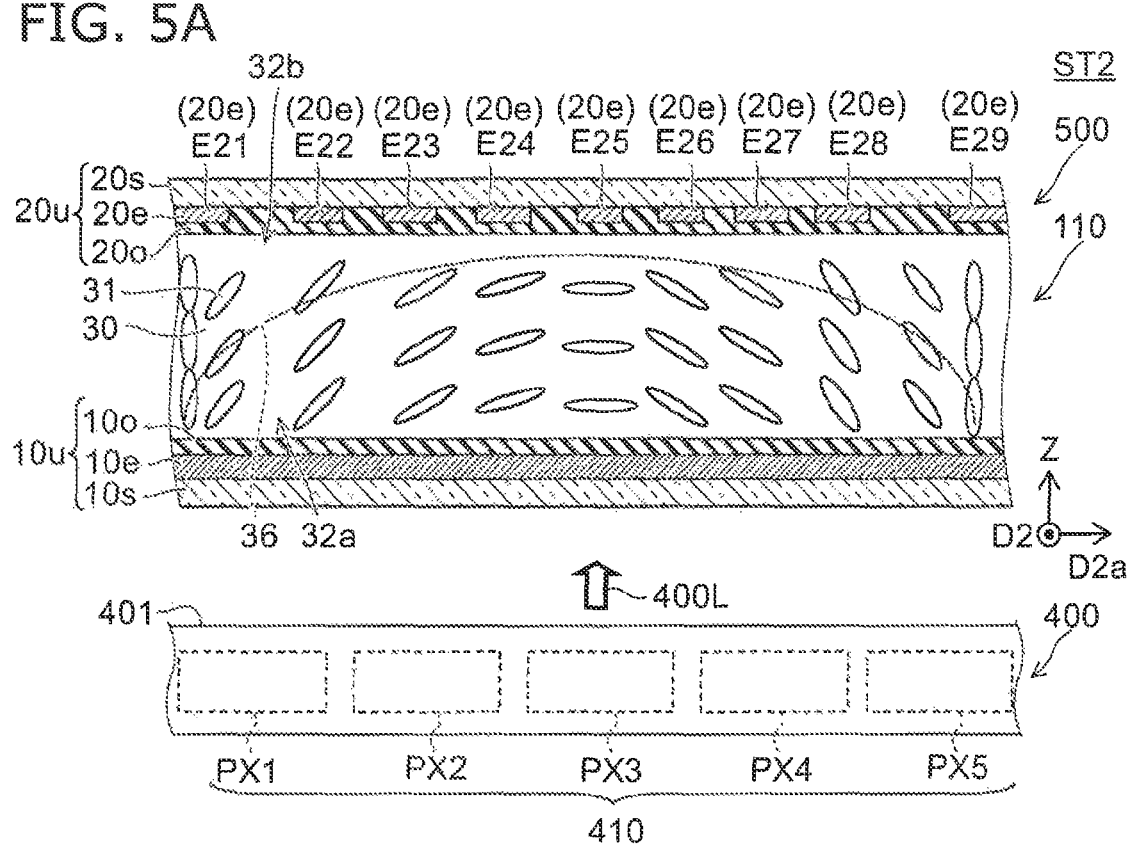
FIG. 5A and FIG. 5B are schematic views showing another operation of the liquid crystal optical device and the image display device according to the first embodiment.
Figure 5B:
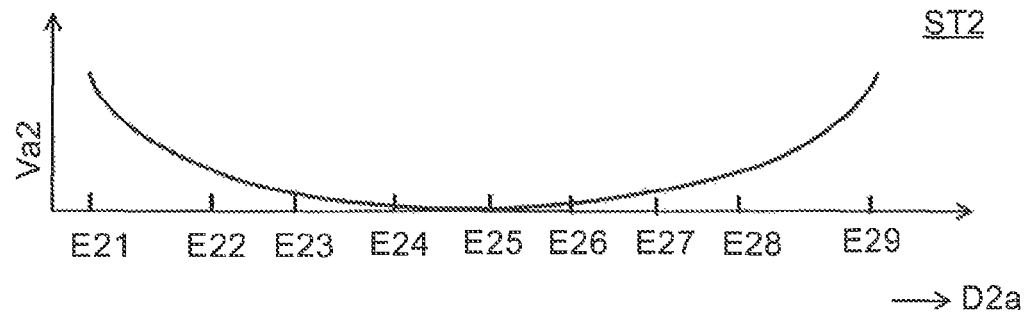

FIG. 5A and FIG. 5B are schematic views illustrating another operation of the liquid crystal optical device and the image display device according to the first embodiment.

FIG. 5A illustrates the liquid crystal optical device 110 and the image display device 500 in a second operating state ST2. FIG. 5A is a schematic cross-sectional view when the liquid crystal optical device 110 and the image display device 500 are cut by a plane including the Z-axis direction and a direction D2a that is perpendicular to the second direction D2 and perpendicular to the Z-axis direction. FIG. 5B illustrates a voltage Va2 supplied to the second electrodes 20e in the second operating state ST2.

In the second operating state ST2, for example, the potentials of the multiple first electrodes 10e are fixed. For example, the potentials of the multiple first electrodes 10e are set to be the ground potential.

Mutually-different voltages are applied to the multiple second electrodes 20e. For example, the second electrodes 20e include electrodes E21 to E29. The electrodes E21 to E29 are arranged in the direction D2a in this order. For example, mutually-different voltages are applied respectively to the electrodes E21 to E29.

The horizontal axis of FIG. 5B is the position in the direction D2a. The vertical axis of FIG. 5B is the voltage Va2 applied to the second electrodes 20e. As shown in FIG. 5B, for example, a high voltage is applied to the electrode E21 and the electrode E29. On the other hand, a low voltage is applied to the electrode E25. For example, the potential of the electrode E25 is set to be the same as the potential of the first electrodes 10e. The voltage is set to decrease for the electrodes E22, E23, and E24 in this order. On the other hand, the voltage is set to increase for the electrodes E26, E27, and E28 in this order.

By applying such a voltage, a high voltage is applied to the liquid crystal layer 30 between the first electrode 10e and the electrodes E21 and E29; and the tilt angle is large. On the other hand, the voltage that is applied to the liquid crystal layer 30 between the electrode E25 and the first electrode 10e is low (e.g., 0); and the tilt angle is small. Thus, the second electrode state is formed by the first drive unit 150; and a second alignment state of the liquid crystal is formed by the second electrode state.

The refractive index distribution (a second refractive index distribution 36) of the liquid crystal layer 30 is formed by the second alignment state. In other words, a second lens is formed. The refractive index of the second refractive index distribution 36 (the second lens) changes along the direction D2a. The refractive index along the second direction D2 is substantially constant.

Thus, in the second operating state ST2, the second refractive index distribution 36 (the second lens) is formed along the direction D2a that is perpendicular to the second direction D2 and perpendicular to the Z-axis direction.

Such electrodes E21 to E29 are used as one set. The set is multiply provided; and the multiple sets are arranged along the direction D2a. Thereby, the second lens is multiply provided. For example, multiple cylindrical lenses extending along the second direction D2 are arranged along the direction D2a orthogonal to the second direction D2.

For example, the position corresponding to the electrode E21 and the position corresponding to the electrode E29 correspond to the lens ends. The position corresponding to the electrode E25 corresponds to the lens center.

On the other hand, in the second operating state ST2, for example, the multiple pixel groups 410 (e.g., first to fifth pixels PY1 to PY5, etc.) are formed in the image display unit 400. The arrangement direction of the first to fifth pixels PY1 to PY5, etc., is different from the arrangement direction of the first to fifth pixels PX1 to PX5. In such a case as well, multiple parallax images are displayed by the multiple pixel groups 410 (e.g., the first to fifth pixels PY1 to PY5, etc.).

A three-dimensional image is perceived by viewing the image light 400L including the multiple parallax images via the second lens having the second refractive index distribution 36 formed in the liquid crystal optical device 110. Thus, in the second operating state ST2, a second three-dimensional image that utilizes the second refractive index distribution 36 (the second lens) along the direction D2a perpendicular to the second direction D2 can be displayed.

Thus, in the liquid crystal optical device and the image display device according to the embodiment as recited above, a first three-dimensional image display that utilizes the first refractive index distribution 35 (the first lens), a second three-dimensional image display that utilizes the second refractive index distribution 36 (the second lens), and a two-dimensional image display that does not use a lens are provided.

Thus, the first drive unit 150 implements the first operation of forming the first refractive index distribution 35 in the liquid crystal layer 30 along the direction D1a perpendicular to the first direction D1 by setting the voltage between the multiple first electrodes 10e and the multiple second electrodes 20e to be in the first state.

The first drive unit 150 implements the second operation of forming the second refractive index distribution 36 in the liquid crystal layer 30 along the direction D2a perpendicular to the second direction D2 by setting the voltage between the multiple first electrodes 10e and the multiple second electrodes 20e to be in the second state.

In the first operation recited above, the first drive unit 150 causes the potentials of at least two of the multiple first electrodes to be different from each other. For example, the voltage illustrated in FIG. 4B is applied to the multiple first electrodes 10e.

In the second operation recited above, the first drive unit 150 causes the potentials of at least two of the multiple second electrodes to be different from each other. For example, the voltage illustrated in FIG. 5B is applied to the multiple second electrodes 20e.

Figures 6A, 6B:
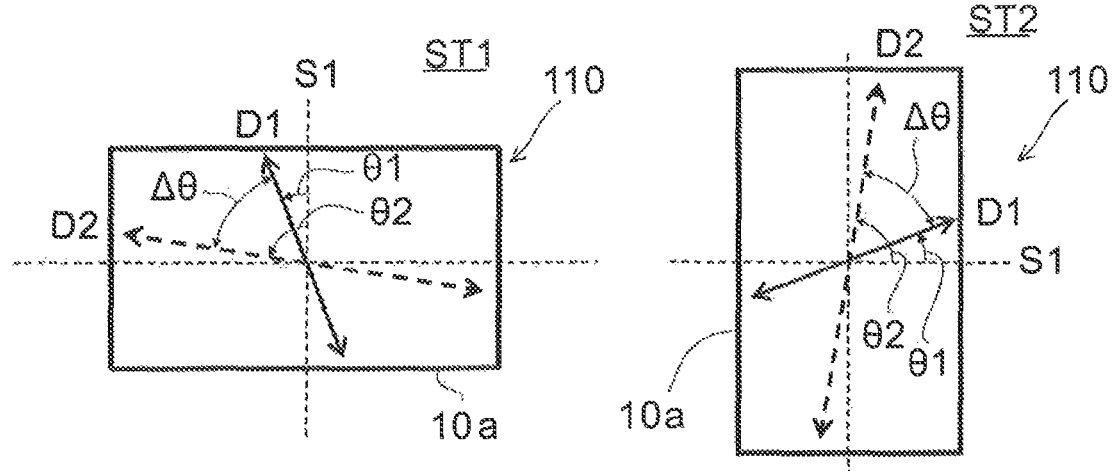
FIG. 6A and FIG. 6B are schematic views showing operations of the liquid crystal optical device and the image display device according to the first embodiment.

FIG. 6A and FIG. 6B are schematic views illustrating operations of the liquid crystal optical device and the image display device according to the first embodiment.

FIG. 6A and FIG. 6B illustrate the first operating state ST1 and the second operating state ST2, respectively.

As illustrated in FIG. 6A, the major surface (e.g., the first surface 10a) of the liquid crystal optical device 110 is substantially a rectangle. In the first operating state ST1, the long sides of the liquid crystal optical device 110 are disposed in the horizontal direction. The image display unit 400 is disposed to correspond to the arrangement of the liquid crystal optical device 110. In other words, the long sides of the screen of the image display device 500 are disposed in the horizontal direction. This display state is used, for example, in the case where a landscape is displayed. This display state may be used for other displays.

On the other hand, in the second operating state ST2 as illustrated in FIG. 6B, the long sides of the liquid crystal optical device 110 are disposed in the vertical direction. In other words, the long sides of the screen of the image display device 500 are disposed in the vertical direction. This display state is used, for example, in the case where a portrait is displayed. This display state may be used for other displays.

Thus, it is desirable for the image display device 500 to be used for a landscape-disposition or for a portrait-disposition. In other words, it is desirable to switch the display screen between a landscape-state and a portrait-state.

For example, in the case where the liquid crystal GRIN lens is not used, the landscape-disposition and the portrait-disposition can be switched easily by modifying the display data displayed by the image display unit 400. In other words, in the case where the two-dimensional image is displayed, it is easy to switch between the landscape-disposition and the portrait-disposition.

However, to display the three-dimensional image using the liquid crystal GRIN lens, it becomes necessary to form appropriate refractive index distributions for both the landscape-disposition and the portrait-disposition. Even if the refractive index distribution is formed along the left and right direction (the parallax direction of the viewer) in the display state of the landscape-disposition, the appropriate three-dimensional display is not provided when switched to the portrait-disposition if a refractive index distribution that is along the vertical direction is formed instead of a refractive index distribution along the left and right direction.

The inventor of the application discovered such a problem. The embodiment solves this problem. In other words, in the liquid crystal optical device and the image display device according to the embodiment as recited above, it is possible to switch between the first three-dimensional image display utilizing the first refractive index distribution 35 (the first lens) and the second three-dimensional image display utilizing the second refractive index distribution 36 (the second lens). Thereby, a good three-dimensional image can be provided even in the case where the image display device 500 is used in the landscape-disposition and in the portrait-disposition.

For example, the first drive unit 150 (or the controller 200) switches the liquid crystal optical device 110 to the first operating state ST1 (e.g., the operating state corresponding to the landscape-disposition); and the second drive unit 450 switches the image display unit 400 to the three-dimensional image display state corresponding to the landscape-disposition. Then, the first drive unit 150 (or the controller 200) switches the liquid crystal optical device 110 to the second operating state ST2 (e.g., the operating state corresponding to the portrait-disposition); and the second drive unit 450 switches the image display unit 400 to the three-dimensional image display state corresponding to the portrait-disposition. Further, the first drive unit 150 (or the controller 200) switches the liquid crystal optical device 110 to a third operating state in which the refractive index is constant (e.g., the state in which the liquid crystal layer 30 is non-activated); and the second drive unit 450 switches the image display unit 400 to the two-dimensional image display state.

In the image display device 500, the two-dimensional image display (the third display operation state) and the three-dimensional image displays (the first operating state ST1 and the second operating state ST2) in which stereoscopic viewing with the naked eyes can be performed are possible by changing the distribution of the refractive index of the liquid crystal optical device 110. Then, the three-dimensional image display is possible even when the screens of the image display unit 400 and the liquid crystal optical device 110 are rotated 90 degrees. In the embodiment, it is possible to selectively switch between three such types of display operations.

For example, in the first operating state ST1 as illustrated in FIG. 6A, the first direction D1 is a rightward and downward direction. On the other hand, in the second operating state ST2 in which the screen is rotated 90 degrees as illustrated in FIG. 6B, the second direction D2 is a leftward and downward direction. Thus, the direction is interchanged between rightward/downward and leftward/downward in the two types of operating states. In the embodiment, the direction (the direction when viewed by the user) of the tilt of the ridgeline of the lens after rotating the display device is different from the direction (the direction when viewed by the user) of the tilt of the ridgeline of the lens prior to rotating the display device.

In other words, the direction (rightward/downward or leftward/downward) of the refractive index distribution of the lens that is formed is different between the first operating state ST1 and the second operating state ST2. Thereby, for example, it is easier to effectively suppress moiré in both operating states.

On the other hand, in the case where the direction (rightward/downward or leftward/downward) of the refractive index distribution is the same between the first operating state ST1 and the second operating state ST2, there are cases where moiré occurs easily in both operating states. For example, the design condition range for which moiré does not occur easily is relatively narrow for two lenses having two types of leftward/downward extension directions.

Conversely, for example, the design margin for which moiré does not occur easily in both operating states can be enlarged by the direction (rightward/downward or leftward/ downward) of the refractive index distribution being different between the first operating state ST1 and the second operating state ST2.

In the embodiment, the first direction D1 and the second direction D2 exist inside the same quadrant when the center of the liquid crystal optical device in the X-Y plane is used as the origin. Thereby, for example, the design margin for which moiré does not occur easily can be enlarged.

The tilt direction of the first direction D1 in the first operating state ST1 is different from the tilt direction of the second direction D2 in the second operating state ST2 after the liquid crystal optical device 110 is rotated 90 degrees around the Z axis. Thereby, the difference between the angles of the first direction D1 and the second direction D2 can be small. Thereby, it is easier to set the direction of the third direction D3 to be a more effective direction.

As described below, for example, it is favorable for the angle between the third direction D3 and the first direction D1 to approach 90 degrees. Thereby, the change of the refractive index of the first refractive index distribution 35 along the direction D1a orthogonal to the first direction D1 can be increased. As described below, in the case where the third direction D3 is parallel to the first direction D1, the change of the refractive index of the first refractive index distribution 35 easily becomes small. Then, the effective refractive index changes greatly when rotating the liquid crystal optical device 110 around the axis of the direction D1a orthogonal to the first direction D1; and the viewing angle dependence becomes large. The viewing angle characteristics improve by setting the angle between the third direction D3 and the first direction D1 to approach 90 degrees.

Similarly, for example, it is favorable for the angle between the third direction D3 and the second direction D2 to approach 90 degrees. Thereby, the change of the refractive index of the second refractive index distribution 36 along the direction D2a orthogonal to the second direction D2 can be increased. As described below, the change of the refractive index of the second refractive index distribution 36 easily becomes small in the case where the third direction D3 is parallel to the second direction D2. Then, the effective refractive index changes greatly when rotating the liquid crystal optical device 110 around the axis of the direction D2a orthogonal to the second direction D2; and the viewing angle dependence becomes large. The viewing angle characteristics improve by setting the angle between the third direction D3 and the second direction D2 to approach 90 degrees.

For example, the third direction D3 is oriented to divide the angle of intersection of the first direction D1 and the second direction D2.

Here, both the angle between the third direction D3 and the first direction D1 and the angle between the third direction D3 and the second direction D2 are not simultaneously 90 degrees because the first direction D1 and the second direction D2 intersect each other. By reducing the difference between the angles of the first direction D1 and the second direction D2, both the angle between the third direction D3 and the first direction D1 and the angle between the third direction D3 and the second direction D2 can approach 90 degrees.

In the embodiment as described above, the first angle θ1 in the first rotation direction from the first side direction S1 of the first side 11 of the first substrate 10s to the first direction D1 is less than 90 degrees and more than 0 degrees. In other words, the first direction D1 is tilted with respect to the first side direction S1. For example, in the case where a parallax image is disposed along the direction orthogonal to the first side direction S1, moiré that occurs between the arrangement of the parallax image and the first direction D1 (or the direction D1a orthogonal to the first direction D1) is suppressed more easily by setting the first direction D1 to be tilted with respect to the first side direction S1.

Similarly, in the embodiment, the second angle θ2 in the first rotation direction from the first side direction S1 to the second direction D2 is less than 90 degrees and more than 0 degrees. In other words, the second direction D2 is tilted with respect to the first side direction S1. Thereby, moiré that occurs between the arrangement of the parallax image and the second direction D2 (or the direction D2a orthogonal to the second direction D2) can be suppressed.

Also, in the embodiment, the second angle θ2 is different from the first angle θ1. In other words, the second direction D2 intersects the first direction D1. Thereby, two types of lenses are formable based on the mutually-different directions of the first direction D1 and the second direction D2. Thereby, two types of three-dimensional image displays are possible by using lenses having two types of directions.

In the example shown in FIG. 6A and FIG. 6B recited above, the first rotation direction is counterclockwise. Also, the second angle θ2 is larger than the first angle θ1. Further, the third angle θ3 is larger than the first angle θ1 and larger than the second angle θ2. The embodiment is not limited thereto; and various modifications are possible.

Figures 7A, 7B:
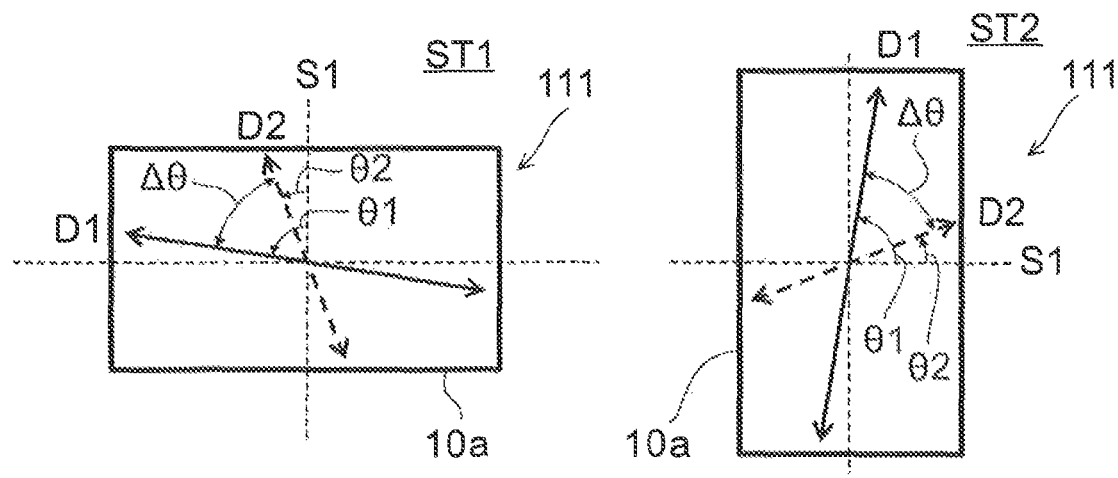
FIG. 7A and FIG. 7B are schematic views showing operations of another liquid crystal optical device and another image display device according to the first embodiment.

FIG. 7A and FIG. 7B are schematic views illustrating operations of another liquid crystal optical device and another image display device according to the first embodiment.

FIG. 7A and FIG. 7B respectively illustrate the first operating state ST1 and the second operating state ST2 of the liquid crystal optical device 111 according to the embodiment.

In the liquid crystal optical device 111 as illustrated in FIG. 7A and FIG. 7B, the first rotation direction is counterclockwise. Also, the second angle θ2 is smaller than the first angle θ1. Further, the third angle θ3 is larger than the first angle θ1 and larger than the second angle θ2.

In the first operating state ST1 as illustrated in FIG. 7A, the first direction D1 is a rightward and downward direction. On the other hand, as illustrated in FIG. 7B, the second direction D2 in the second operating state ST2 in which the screen is rotated 90 degrees is a leftward and downward direction. Thus, the direction is interchanged between rightward/downward and leftward/downward in the two types of operating states.

Figure 8A:
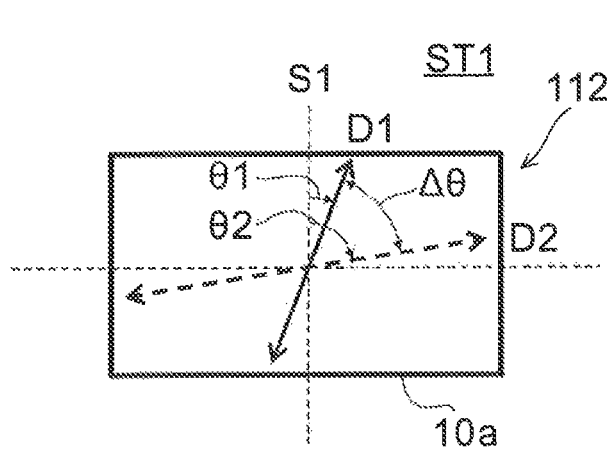
FIG. 8A and FIG. 8B are schematic views showing operations of another liquid crystal optical device and another image display device according to the first embodiment.
Figure 8B:
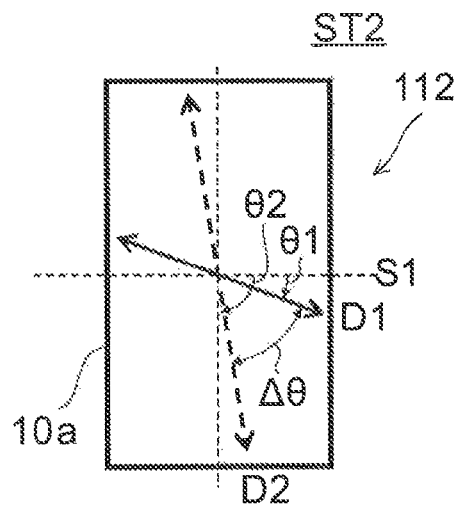

FIG. 8A and FIG. 8B are schematic views illustrating operations of another liquid crystal optical device and another image display device according to the first embodiment.

FIG. 8A and FIG. 8B respectively illustrate the first operating state ST1 and the second operating state ST2 of the liquid crystal optical device 112 according to the embodiment.

In the liquid crystal optical device 112 as illustrated in FIG. 8A and FIG. 8B, the first rotation direction is clockwise. Also, the second angle θ2 is larger than the first angle θ1. Further, the third angle θ3 is larger than the first angle θ1 and larger than the second angle θ2.

In the first operating state ST1 as illustrated in FIG. 8A, the first direction D1 is a leftward and downward direction. On the other hand, as illustrated in FIG. 8B, the second direction D2 in the second operating state ST2 in which the screen is rotated 90 degrees is a rightward and downward direction. Thus, the direction is interchanged between rightward/downward and leftward/downward in the two types of operating states.

Figure 9A:
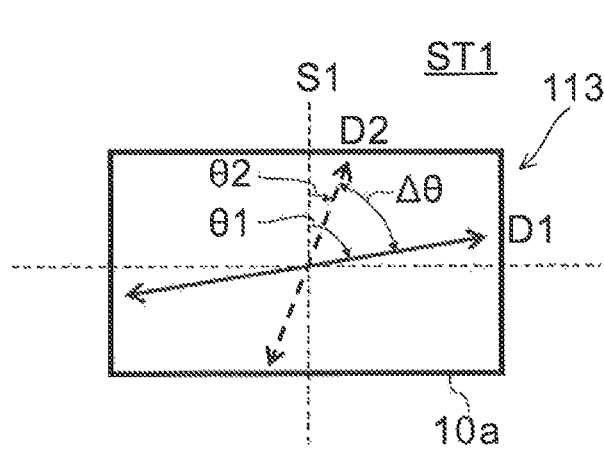
FIG. 9A and FIG. 9B are schematic views showing operations of another liquid crystal optical device and another image display device according to the first embodiment.
Figure 9B:
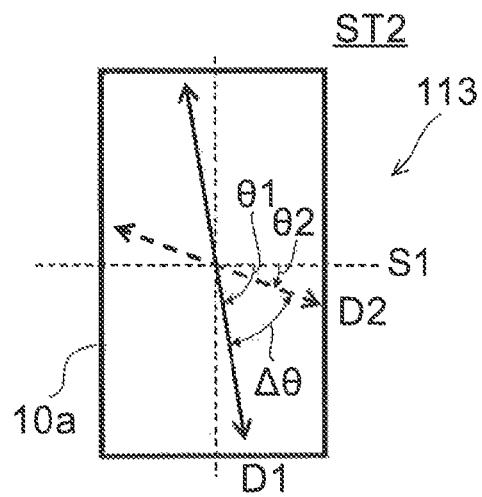

FIG. 9A and FIG. 9B are schematic views illustrating operations of another liquid crystal optical device and another image display device according to the first embodiment.

FIG. 9A and FIG. 9B respectively illustrate the first operating state ST1 and the second operating state ST2 of the liquid crystal optical device 113 according to the embodiment.

In the liquid crystal optical device 113 as illustrated in FIG. 9A and FIG. 9B, the first rotation direction is clockwise. Also, the second angle θ2 is smaller than the first angle θ1. Further, the third angle θ3 is larger than the first angle θ1 and larger than the second angle θ2.

In the first operating state ST1 as illustrated in FIG. 9A, the first direction D1 is a leftward and downward direction. On the other hand, as illustrated in FIG. 9B, the second direction D2 in the second operating state ST2 in which the screen is rotated 90 degrees is a rightward and downward direction. Thus, the direction is interchanged between rightward/downward and leftward/downward in the two types of operating states.

In the liquid crystal optical devices 110 to 113 recited above, the first direction D1 and the second direction D2 exist inside the same quadrant when the center of the liquid crystal optical device in the X-Y plane is used as the origin.

Thereby, the difference between the angles of the first direction D1 and the second direction D2 can be small. Thereby, it is easier to set the direction of the third direction D3 to be a more effective direction.

Then, an appropriate lens corresponding to the parallax image of the image display unit 400 is formable while suppressing the moiré that occurs between the liquid crystal optical device and the image display unit 400 for both before and after rotating the screen 90 degrees. Thereby, appropriate three-dimensional images for both before and after rotating the screen 90 degrees can be provided.

In the liquid crystal optical device 110 illustrated in FIG. 6A and FIG. 6B, the first angle θ1 is not less than 5 degrees and not more than 40 degrees; and the second angle θ2 is not less than 45 degrees and not more than 85 degrees. A difference Δθ between the first angle θ1 and the second angle θ2 is not less than 5 degrees and not more than 80 degrees. The third angle θ3 is, for example, not less than 90 degrees and not more than 180 degrees. These angles are counterclockwise.

In the liquid crystal optical device 110, it is favorable for, for example, the first angle θ1 to be not less than 10 degrees and not more than 30 degrees. It is favorable for the second angle θ2 to be not less than 45 degrees and not more than 70 degrees. It is favorable for the difference Δθ between the first angle θ1 and the second angle θ2 to be not less than 15 degrees and not more than 40 degrees. It is favorable for the third angle θ3 to be, for example, not less than 130 degrees and not more than 160 degrees.

In the liquid crystal optical device 110, for example, it is favorable for the first angle θ1 to be about 25 degrees (not less than 20 degrees and not more than 30 degrees). For example, it is favorable for the second angle θ2 to be about 65 degrees (not less than 60 degrees and not more than 70 degrees). It is favorable for the third angle θ3 to be about 145 degrees (not less than 140 degrees and not more than 150 degrees). Thereby, a good refractive index distribution of the lens is formed easily in both the first operating state ST1 and the second operating state.

In the liquid crystal optical device 111 illustrated in FIG. 7A and FIG. 7B, the first angle θ1 is not less than 45 degrees and not more than 85 degrees; and the second angle θ2 is not less than 5 degrees and not more than 40 degrees. The difference Δθ between the first angle θ1 and the second angle θ2 is not less than 5 degrees and not more than 85 degrees. The third angle θ3 is, for example, not less than 90 degrees and not more than 180 degrees. These angles are counterclockwise.

In the liquid crystal optical device 111, for example, it is favorable for the first angle θ1 to be not less than 45 degrees and not more than 60 degrees. It is favorable for the second angle θ2 to be not less than 30 degrees and not more than 44 degrees. It is favorable for the difference Δθ between the first angle θ1 and the second angle θ2 to be not less than 1 degree and not more than 30 degrees. It is favorable for the third angle θ3 to be, for example, not less than 100 degrees and not more than 170 degrees.

In the liquid crystal optical device 111, for example, it is favorable for the first angle θ1 to be about 50 degrees (not less than 45 degrees and not more than 55 degrees). For example, it is favorable for the second angle θ2 to be about 44 degrees (not less than 39 degrees and not more than 49 degrees). It is favorable for the third angle θ3 to be about 135 degrees (not less than 130 degrees and not more than 140 degrees). Thereby, a good refractive index distribution of the lens is formed easily in both the first operating state ST1 and the second operating state.

In the liquid crystal optical device 112 illustrated in FIG. 8A and FIG. 8B, the first angle θ1 is not less than 5 degrees and not more than 40 degrees; and the second angle θ2 is not less than 45 degrees and not more than 85 degrees. The difference Δθ between the first angle θ1 and the second angle θ2 is not less than 5 degrees and not more than 80 degrees. The third angle θ3 is, for example, not less than 0 degrees and not more than 90 degrees. These angles are clockwise.

In the liquid crystal optical device 112, for example, it is favorable for the first angle θ1 to be not less than 10 degrees and not more than 30 degrees. It is favorable for the second angle θ2 to be not less than 45 degrees and not more than 70 degrees. It is favorable for the difference Δθ between the first angle θ1 and the second angle 82 to be not less than 15 degrees and not more than 40 degrees. It is favorable for the third angle θ3 to be, for example, not less than 130 degrees and not more than 160 degrees.

In the liquid crystal optical device 112, for example, it is favorable for the first angle θ1 to be about 25 degrees (not less than 20 degrees and not more than 30 degrees). For example, it is favorable for the second angle θ2 to be about 65 degrees (not less than 60 degrees and not more than 70 degrees). It is favorable for the third angle θ3 to be about 145 degrees (not less than 140 degrees and not more than 150 degrees). Thereby, a good refractive index distribution of the lens is formed easily in both the first operating state ST1 and the second operating state.

In the liquid crystal optical device 113 illustrated in FIG. 9A and FIG. 9B, the first angle θ1 is not less than 45 degrees and not more than 85 degrees; and the second angle 82 is not less than 5 degrees and not more than 40 degrees. The difference Δθ between the first angle θ1 and the second angle θ2 is not less than 5 degrees and not more than 85 degrees. The third angle θ3 is, for example, not less than 0 degrees and not more than 90 degrees. These angles are clockwise.

In the liquid crystal optical device 113, for example, it is favorable for the first angle θ1 to be not less than 45 degrees and not more than 60 degrees. It is favorable for the second angle θ2 to be not less than 30 degrees and not more than 44 degrees. It is favorable for the difference Δθ between the first angle θ1 and the second angle θ2 to be not less than 1 degree and not more than 30 degrees. It is favorable for the third angle θ3 to be, for example, not less than 100 degrees and not more than 170 degrees.

In the liquid crystal optical device 113, for example, it is favorable for the first angle θ1 to be about 50 degrees (not less than 45 degrees and not more than 55 degrees). For example, it is favorable for the second angle θ2 to be about 44 degrees (not less than 39 degrees and not more than 49 degrees). It is favorable for the third angle θ3 to be about 135 degrees (not less than 130 degrees and not more than 140 degrees). Thereby, a good refractive index distribution of the lens is formed easily in both the first operating state ST1 and the second operating state.

An example of the characteristics when the angle between the long-axis direction 31a (the third direction D3) of the liquid crystal molecules 31 and the extension direction (the first direction D1) of the first electrodes 10e is changed will now be described.

Figure 10:
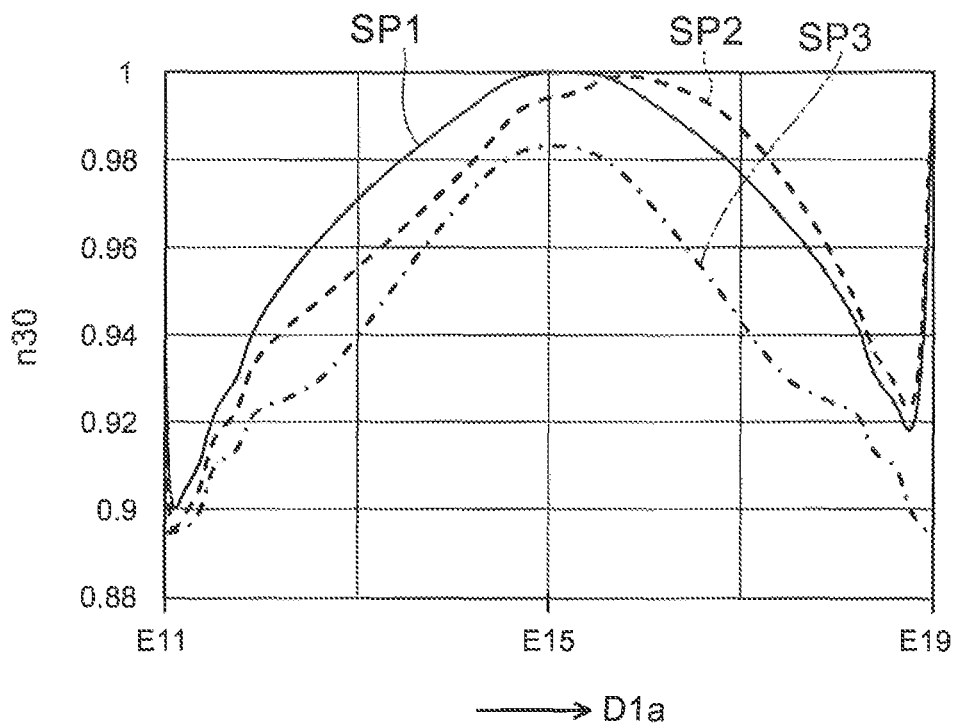
FIG. 10 is a graph showing characteristics of the liquid crystal optical device.

FIG. 10 is a graph illustrating characteristics of the liquid crystal optical device.

FIG. 10 illustrates simulation results of refractive index distributions of the liquid crystal layer 30 in the first operating state ST1. In FIG. 10, the horizontal axis is the position in the direction D1a orthogonal to the first direction D1. In FIG. 10, the left end corresponds to the position of the electrode E11; the right end corresponds to the position of the electrode E19; and the center corresponds to the position of the electrode E15. The vertical axis is a normalized refractive index n30 of the liquid crystal layer 30.

FIG. 10 illustrates the characteristics of a first configuration SP1, a second configuration SP2, and a third configuration SP3. In the first configuration SP1, the angle between the third direction D3 and the first direction D1 is 90 degrees. In the second configuration SP2, the angle between the third direction D3 and the first direction D1 is 50 degrees. In the third configuration SP3, the angle between the third direction D3 and the first direction D1 is 0 degrees.

It can be seen from FIG. 10 that a refractive index distribution having a good lens configuration is obtained for the first configuration SP1 in which the angle between the third direction D3 and the first direction D1 is 90 degrees. The characteristic of the first configuration SP1 shown in FIG. 10 is laterally asymmetric. This is caused by the action between the direction of the electric field and the direction of the pretilt provided to the liquid crystal. Practically, this lateral asymmetry is not a problem.

On the other hand, the configuration of the refractive index distribution is different from the lens configuration for the second configuration SP2 in which the angle between the third direction D3 and the first direction D1 is 50 degrees. The configuration of the refractive index distribution is greatly different from the lens configuration for the third configuration SP3 in which the angle between the third direction D3 and the first direction D1 is 0 degrees.

Such a phenomenon is related to the electric field (the lateral electric field) that occurs due to the voltage applied to the first electrodes 10e to have a component in the X-Y plane. Differences between the states of the liquid crystal molecules 31 when the voltage is applied will now be described for when the angle between the third direction D3 and the first direction D1 is changed.

Figures 11A, 11B:
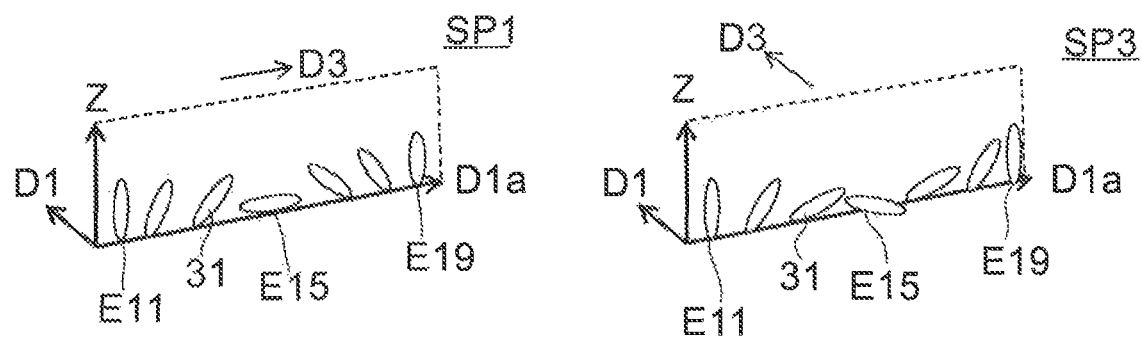
FIG. 11A and FIG. 11B are schematic views showing characteristics of liquid crystal optical devices.

FIG. 11A and FIG. 11B are schematic views illustrating characteristics of liquid crystal optical devices.

These drawings are model-like illustrations of the direction of the liquid crystal molecules 31 in the first operating state ST1. These drawings show the alignment of the liquid crystal molecules 31 at the first electrodes 10e from the position of the electrode E11 to the position of the electrode E19.

FIG. 11A corresponds to the first configuration SP1 recited above; and the third direction D3 is orthogonal to the first direction D1. For example, in the non-activated state in which the voltage is not applied, the long axis of the liquid crystal molecules 31 is aligned in the direction D1a orthogonal to the extension direction of the first electrodes 10e.

FIG. 11B corresponds to the third configuration SP3 recited above; and the third direction D3 is parallel to the first direction D1. For example, in the non-activated state in which the voltage is not applied, the long axis of the liquid crystal molecules 31 is aligned in the extension direction of the first electrodes 10e.

In the first configuration SP1 in which the third direction D3 is orthogonal to the first direction D1 as shown in FIG. 11A, the direction of the long axis of the liquid crystal molecules 31 changes in the plane including the Z-axis direction and the direction D1a. In such a case, the direction of the long axis of the liquid crystal molecules 31 is aligned in the direction D1a at the position of the electrode E15 corresponding to the lens center. Thereby, as illustrated in FIG. 10, a refractive index distribution having a good lens configuration is obtained for the first configuration SP1.

Conversely, in the third configuration SP3 in which the third direction D3 is parallel to the first direction D1 as shown in FIG. 11B, the direction of the long axis of the liquid crystal molecules 31 changes in the first direction D1, the direction D1a, and the Z-axis direction. Such a change of the direction of the long axis of the liquid crystal molecules 31 is due to the electric field that is formed by the first electrodes 10e to have a component in the direction D1a. In other words, such a change of the direction of the long axis of the liquid crystal molecules 31 is caused by the lateral electric field. In such a case, the long axis of the liquid crystal molecules 31 is aligned in the first direction D1 at the position of the electrode E15 corresponding to the lens center. Thereby, as illustrated in FIG. 10, the configuration of the refractive index distribution of the third configuration SP3 is greatly different from the lens configuration.

Moreover, such a difference affects the viewing angle characteristics.

Figure 12A:
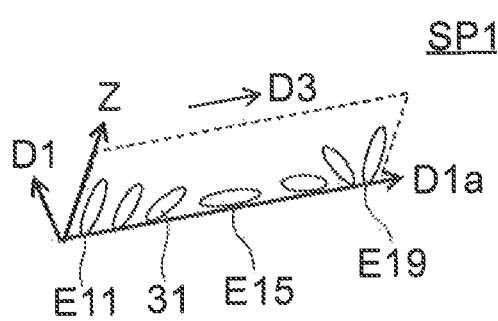
FIG. 12A and FIG. 12B are schematic views showing characteristics of liquid crystal optical devices.
Figure 12B:
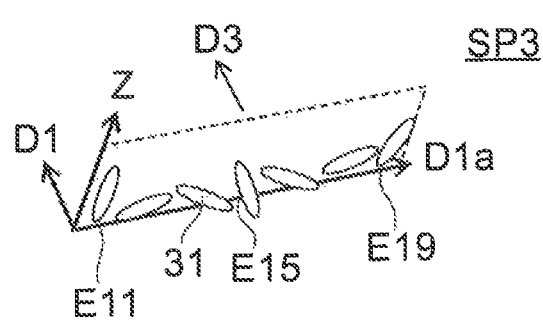

FIG. 12A and FIG. 12B are schematic views illustrating characteristics of liquid crystal optical devices.

These drawings are model-like illustrations of the characteristics for the first configuration SP1 and the third configuration SP3 recited above in the case where the viewpoint or the liquid crystal optical device is rotated around the axis of the direction D1a (the direction parallel to the X-Y plane and perpendicular to the first direction D1).

FIG. 12A and FIG. 12B respectively correspond to a state (a second viewing angle direction state) in which the state (the first viewing angle direction state) of FIG. 11A and FIG. 11B is rotated a prescribed angle around the axis of the direction D1a. For example, the second viewing angle direction state is in a direction rotated 30 degrees from the first viewing angle direction state.

For example, in the case where the first angle θ1 (the angle between the first direction D1 and the first side direction S1 of the first side 11 of the first substrate 10s) is relatively small, the second viewing angle direction state may be considered to be a state in which the liquid crystal display device is rotated around the X-axis direction.

For the first configuration SP1 as illustrated in FIG. 12A, the effective birefringence at the position of the lens center substantially does not change even in the case where the viewing angle is changed around the axis of the direction D1a. In other words, the change of the optical characteristics when changing the viewing angle is small.

On the other hand, for the third configuration SP3 as illustrated in FIG. 12B, rotation of the long axis of the liquid crystal molecules 31 occurs when the viewing angle is changed around the axis of the direction D1a. Therefore, the effective birefringence at the position of the lens center changes greatly according to the viewing angle direction. In other words, the change of the optical characteristics when changing the viewing angle is large.

Thus, by setting the third direction D3 to be orthogonal to the first direction D1, a liquid crystal optical device having low viewing angle dependence is obtained.

For example, in the embodiment, the third direction D3 is set to be orthogonal to the first direction D1. In such a case, as described above, the third direction D3 cannot be set to be orthogonal to both the first direction D1 and the second direction D2 because the second direction D2 intersects the first direction D1.

For example, the third direction D3 may be set to be orthogonal to the first direction D1 in an application in which the change of the viewing angle around the axis of the direction D1a orthogonal to the first direction D1 is large. For example, the absolute value of the difference between the first angle θ1 and the third angle θ3 may be not less than 87 degrees and not more than 93 degrees.

On the other hand, in an application in which the change of the viewing angle around the axis of the direction D2a orthogonal to the second direction D2 is large, the third direction D3 may be set to be orthogonal to the second direction D2. For example, the absolute value of the difference between the second angle θ2 and the third angle θ3 may be not less than 87 degrees and not more than 93 degrees.

Thus, the relationship between the third direction D3 and the first direction D1 and the relationship between the third direction D3 and the second direction D2 may be determined according to the application. These directions may be set such that both the angle between the third direction D3 and the first direction D1 and the angle between the third direction D3 and the second direction D2 approach 90 degrees.

For example, the viewing angle characteristics when the viewing angle of the liquid crystal optical device is changed can be improved by setting both the angle between the third direction D3 and the first direction D1 and the angle between the third direction D3 and the second direction D2 to approach 90 degrees. In other words, good viewing angle characteristics are obtained in both the first operating state ST1 and the second operating state ST2.

For example, the viewing angle characteristics are particularly good when the angle between the third direction D3 and the first direction D1 is not less than 70 degrees and the angle between the third direction D3 and the second direction D2 is not less than 70 degrees. For these angles, for example, it is easier for the lateral electric field due to the first electrodes 10e or the second electrodes 20e to act on the liquid crystal molecules 31. Thereby, the viewing angle characteristics can be improved effectively.

In the liquid crystal optical devices 110 to 113, it is favorable for the absolute value of the difference Δθ between the first angle θ1 and the second angle θ2 to be 60 degrees or less. By the absolute value of the difference Δθ being set to be 60 degrees or less, both the angle between the third direction D3 and the first direction D1 and the angle between the third direction D3 and the second direction D2 can be large. Thereby, good viewing angle characteristics are obtained.

On the other hand, it is favorable for the absolute value of the difference between the third angle θ3 and the first angle θ1 to be 20 degrees or more. It is favorable for the absolute value of the difference between the third angle θ3 and the second angle θ2 to be 20 degrees or more.

FIG. 13A to FIG. 13F are schematic views illustrating liquid crystal optical devices according to the first embodiment.

These drawings illustrate the first direction D1, the second direction D2, the third direction D3, the first angle θ1, the second angle θ2, and the third angle θ3.

Figure 13A:
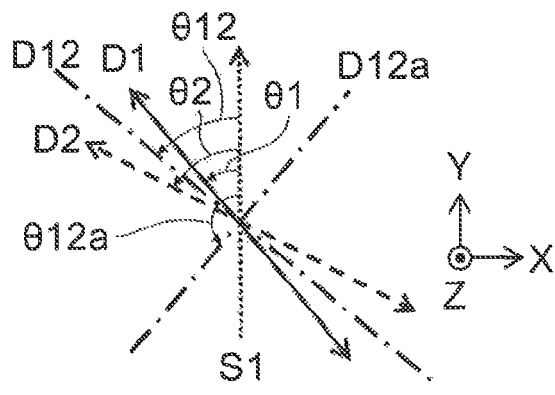
FIG. 13A to FIG. 13F are schematic views showing liquid crystal optical devices according to the first embodiment.

As illustrated in FIG. 13A, the average angle between the first angle θ1 (degrees) and the second angle θ2 (degrees) is taken as an angle θ12 (degrees). The angle θ12 is (θ1+θ2)/2. The direction of the angle θ12 is taken as a direction D12. A direction orthogonal to the direction D12 (and orthogonal to the Z-axis direction) is taken as a direction D12a. An angle θ12a (degrees) in the first rotation direction from the first side direction S1 to the direction D12a is (θ1+θ2)/2+90 degrees.

For example, by setting the third direction D3 to be parallel to the direction D12a recited above, both the angle between the third direction D3 and the first direction D1 and the angle between the third direction D3 and the second direction D2 can be large. For example, these angles can be set to approach 90 degrees.

Figure 13B:
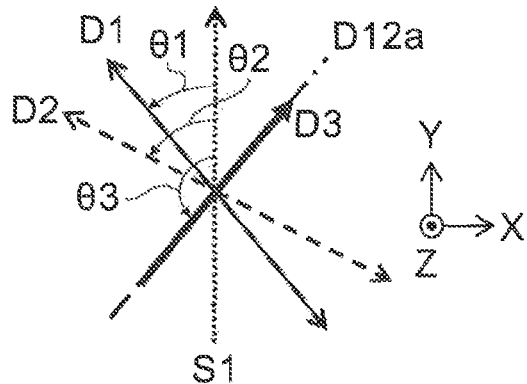

For example, as illustrated in FIG. 13B, the third direction D3 is parallel to the direction D12a. In such a case, the third angle θ3 (degrees) is (θ1+θ2)/2+90 degrees.

In the embodiment, for example, the third direction D3 may be tilted with respect to the direction D12a in a range of plus or minus 20 degrees from the direction D12a. In such a case, the relationship (θ1+θ2)/2+70 degrees≤θ3≤(θ1+θ2)/2+110 degrees is satisfied, where θ1 (degrees) is the first angle, θ2 (degrees) is the second angle, and θ3 (degrees) is the third angle.

In this configuration, it is easy to obtain good viewing angle characteristics in both the first operating state ST1 and the second operating state ST2.

Figure 13C:
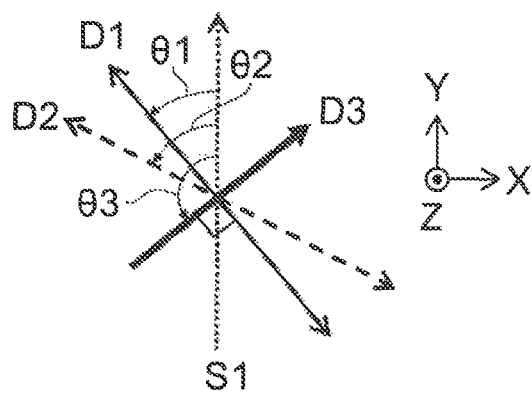

As illustrated in FIG. 13C, the third direction D3 may be orthogonal to the first direction D1. In such a case, the third direction D3 tilts with respect to the second direction D2. In such a case, for example, particularly good viewing angle characteristics are obtained in the first operating state ST1.

Figure 13D:
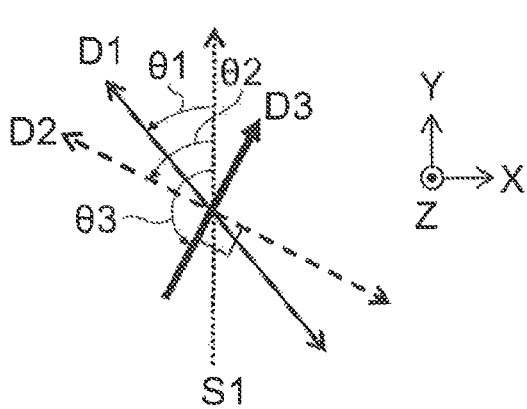

As illustrated in FIG. 13D, the third direction D3 may be orthogonal to the second direction D2. In such a case, the third direction D3 tilts with respect to the first direction D1. In such a case, for example, particularly good viewing angle characteristics are obtained in the second operating state ST2.

Figure 13E:
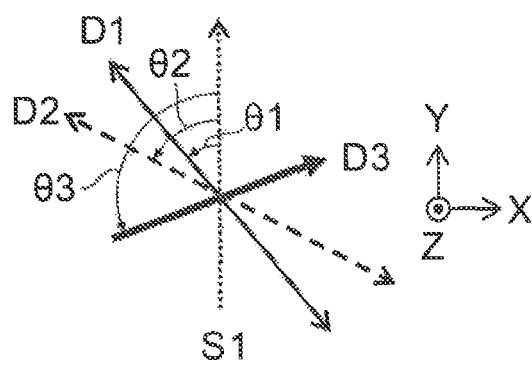
Figure 13F:
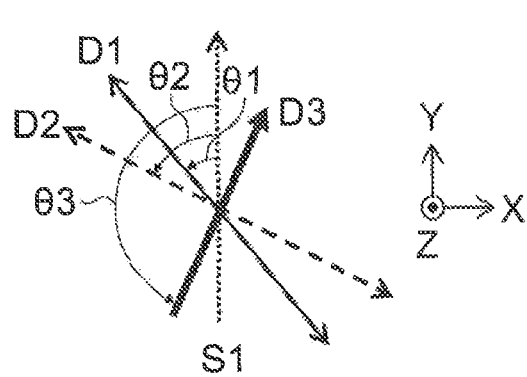

As illustrated in FIG. 13E and FIG. 13F, the third direction D3 may be tilted with respect to the first direction D1, the second direction D2, the direction D12, and the direction D12a.

In the examples shown in FIG. 13A to FIG. 13F, the third angle θ3 is larger than the first angle θ1 and larger than the second angle θ2.

Figure 14:
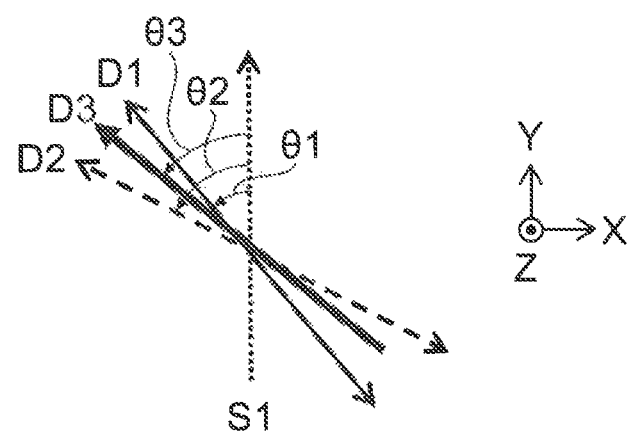
FIG. 14 is a schematic view showing another liquid crystal optical device according to the first embodiment.

FIG. 14 is a schematic view illustrating another liquid crystal optical device according to the first embodiment.

FIG. 14 illustrates the first direction D1, the second direction D2, the third direction D3, the first angle θ1, the second angle θ2, and the third angle θ3.

In the example, the third angle θ3 is larger than the first angle θ1 and smaller than the second angle θ2 as shown in the example of FIG. 14. The third angle θ3 may be larger than the second angle θ2 and smaller than the first angle θ1. In other words, in the example, the third angle θ3 is an angle between the first angle θ1 and the second angle θ2.

Even in the case where such an angle is used, it is possible to obtain and switch between the refractive index distribution in the direction D1a orthogonal to the first direction D1 and the refractive index distribution in the direction D2a orthogonal to the second direction D2. Thereby, a liquid crystal optical device and an image display device that are easier to use are obtained.

For example, when the angles are counterclockwise, the first angle θ1 is not less than 5 degrees and not more than 40 degrees; and the second angle θ2 is not less than 45 degrees and not more than 85 degrees. The difference Δθ between the first angle θ1 and the second angle θ2 may be, for example, not less than 5 degrees and not more than 80 degrees. Then, the third angle θ3 is an angle between the first angle θ1 and the second angle θ2.

For example, when the angles are counterclockwise, the first angle θ1 is not less than 45 degrees and not more than 85 degrees; and the second angle θ2 is not less than 5 degrees and not more than 40 degrees. The difference Δθ between the first angle θ1 and the second angle θ2 may be, for example, not less than 5 degrees and not more than 80 degrees. Then, the third angle θ3 is an angle between the first angle θ1 and the second angle θ2.

For example, when the angles are clockwise, the first angle θ1 is not less than 5 degrees and not more than 40 degrees; and the second angle θ2 is not less than 45 degrees and not more than 85 degrees. The difference Δθ between the first angle θ1 and the second angle θ2 may be, for example, not less than 5 degrees and not more than 80 degrees. Then, the third angle θ3 is an angle between the first angle θ1 and the second angle θ2.

For example, when the angles are clockwise, the first angle θ1 is not less than 45 degrees and not more than 85 degrees; and the second angle θ2 is not less than 5 degrees and not more than 40 degrees. The difference Δθ between the first angle θ1 and the second angle θ2 may be, for example, not less than 5 degrees and not more than 80 degrees. Then, the third angle θ3 is an angle between the first angle θ1 and the second angle θ2.

For example, in the case where the difference Δθ between the first angle θ1 and the second angle θ2 is relatively large (e.g., in the case where the difference Δθ is not less than 40 degrees), the third angle θ3 may be set to be an angle between the first angle θ1 and the second angle θ2. In such a case as well, good viewing angle characteristics are obtained.

Better viewing angle characteristics are obtained for the case where the third angle θ3 is larger than the first angle θ1 and larger than the second angle θ2 than for the case where the third angle θ3 is between the first angle θ1 and the second angle θ2.

Figure 15A:
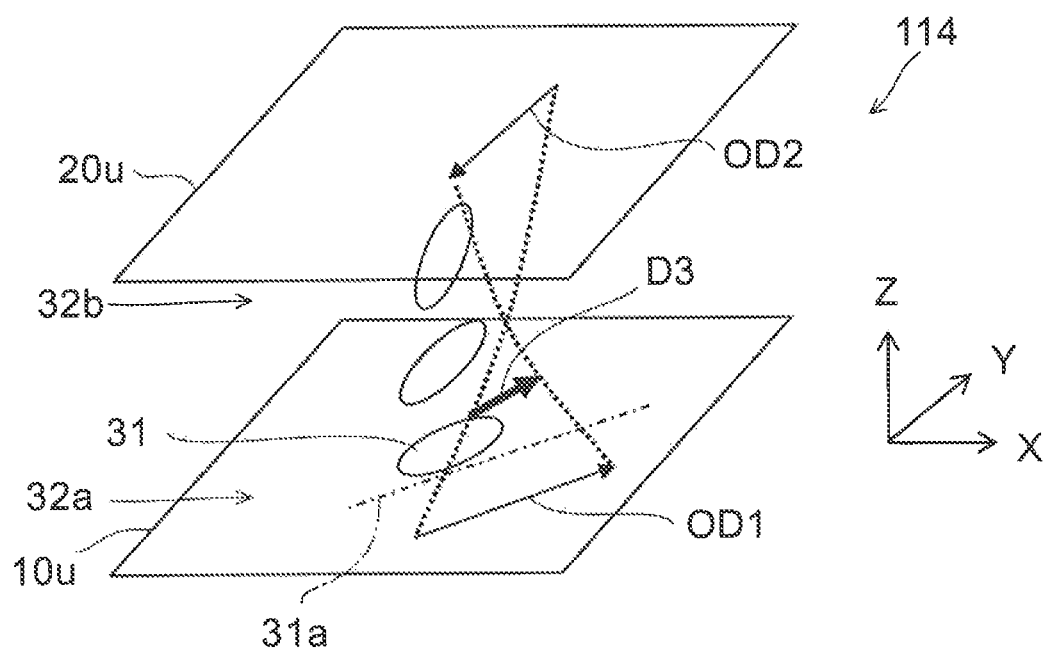
FIG. 15A and FIG. 15B are schematic views showing another liquid crystal optical device according to the first embodiment.
Figure 15B:
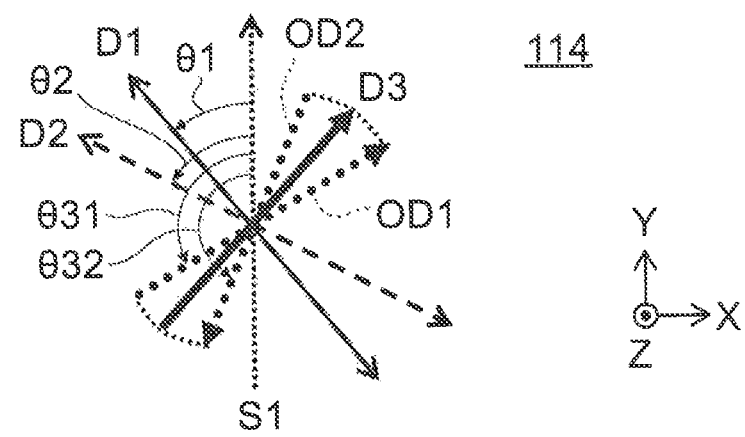

FIG. 15A and FIG. 15B are schematic views illustrating another liquid crystal optical device according to the first embodiment.

FIG. 15A illustrates the state of the liquid crystal molecules 31 of the liquid crystal layer 30. FIG. 15B illustrates various directions and angles.

In the liquid crystal optical device 114 according to the embodiment as shown in FIG. 15B, the first alignment direction OD1 of the first substrate side portion 32a of the liquid crystal layer 30 intersects the second alignment direction OD2 of the second substrate side portion 32b of the liquid crystal layer 30.

For example, the absolute value of the angle between the first alignment direction OD1 and the second alignment direction OD2 is not less than 3 degrees. It is favorable for the absolute value of the angle to be less than 20 degrees.

The long-axis direction 31a of the liquid crystal molecules 31 of the liquid crystal layer 30 twists along the Z-axis direction (i.e., a direction perpendicular to the first direction D1 and the second direction D2).

For example, the alignment processing direction (e.g., the rubbing direction) of the first substrate unit 10u intersects the alignment processing direction (e.g., the rubbing direction) of the second substrate unit 20u. The twist direction is determined according to the two rubbing directions and the pretilt angle. The twist direction of the liquid crystal layer 30 may be determined by the twist direction of a chiral agent by using a liquid crystal including the chiral agent as the liquid crystal layer 30.

In such a liquid crystal optical device 114 as well, the third direction D3 is determined. Because the liquid crystal has the twist alignment, the third direction D3 changes in a prescribed range.

For example, as illustrated in FIG. 15B, the angle in the first rotation direction from the first side direction S1 to the direction of the first alignment direction OD1 (one of the long-axis directions 31a of the liquid crystal molecules 31) when projected onto the X-Y plane is taken as a fourth angle θ31. The fourth angle θ31 is one of the third angles θ3 that change by twisting.

On the other hand, the angle in the first rotation direction from the first side direction S1 to the direction of the second alignment direction OD2 (one of the long-axis directions 31a of the liquid crystal molecules 31) when projected onto the X-Y plane is taken as a fifth angle θ32. The fifth angle θ32 is one of the third angles θ3 that change by twisting.

The fourth angle θ31 and the fifth angle θ32 are different from the first angle θ1 and different from the second angle θ2. In such a case as well, it is possible to obtain and switch between the refractive index distribution in the direction orthogonal to the first direction D1 and the refractive index distribution in the direction orthogonal to the second direction D2. Thereby, a liquid crystal optical device and an image display device that are easier to use are obtained.

For example, both the first alignment direction OD1 and the second alignment direction OD2 are positioned inside the obtuse angle formed between the first direction D1 and the second direction D2.

For example, in the case where the liquid crystal layer 30 has a pretilt, a reverse tilt alignment nonuniformity occurs easily when the liquid crystal layer 30 is switched to the activated state by applying the voltage between the first electrodes 10e and the second electrodes 20e. In the reverse tilt alignment nonuniformity, multiple regions having mutually-different tilt directions of the liquid crystal molecules 31 occur. The effective refractive index is different between the multiple regions having the mutually-different tilt directions; and the refractive index distribution of the lens that is formed is biased. The reverse tilt alignment nonuniformity occurs due to the action between the initial alignment of the liquid crystal and the lateral electric field generated by the applied voltage. For example, the reverse tilt alignment nonuniformity occurs easily in the case where the initial alignment of the liquid crystal is a homogeneous alignment.

The occurrence of such a reverse tilt alignment nonuniformity can be suppressed by the initial alignment of the liquid crystal having a twist component.

In other words, the absolute value of the angle between the first alignment direction OD1 and the second alignment direction OD2 is set to be 3 degrees or more; and the long-axis direction 31a of the liquid crystal molecules 31 of the liquid crystal layer 30 is caused to twist along the Z-axis direction. Thereby, the bias of the refractive index due to the reverse tilt occurring at the vicinity of the second substrate 20s can be reduced. The bias in the alignment state of the liquid crystal layer 30 as an entirety can be reduced. Thereby, the viewing angle characteristics of the liquid crystal optical device can be improved further.

In the embodiment as described in regard to FIG. 1, for example, the light (the image light 400L) that includes the image information includes polarized light. The polarizing axis of the polarized light is parallel to the first transmission axis 421p. The direction of the polarizing axis when projected onto the X-Y plane intersects the first direction D1 and intersects the second direction D2. Thereby, the lens effect can be caused to act effectively on the image light 400L for both the first lens based on the first electrodes 10e and the second lens based on the second electrodes 20e.

Second Embodiment

In the embodiment, the first operating state ST1 and the second operating state ST2 recited above are switched by sensing the rotation or tilt of at least one selected from the liquid crystal optical device and the image display unit 400. This operation is performed by, for example, the controller 200 (referring to FIG. 1).

As shown in FIG. 1, the controller 200 acquires, for example, information relating to the viewing direction estimated when a viewer 350 views the image display unit 400. The viewing direction includes, for example, the rotation direction around the Z-axis direction. The light (the image light 400L) that includes the image information is incident on the viewer 350.

For example, a first sensor 310 that senses the viewing direction of the image display unit 400 by the viewer 350 is provided as the sensor 300. For example, the first sensor 310 images the facial portion of the viewer 350 and estimates the orientation of the face of the viewer 350 from the image of the facial portion that is imaged. Then, the first sensor 310 estimates the viewing direction of the image display unit 400 by the viewer 350 from the orientation of the face of the viewer that is estimated. Then, the first sensor 310 supplies the information relating to the viewing direction that is sensed to the controller 200.

Then, the controller 200 causes the first drive unit 150 to implement at least one selected from the first operation and the second operation based on the acquired information. In other words, the controller 200 causes the first drive unit 150 to form one selected from the first operating state ST1 and the second operating state ST2.

At this time, the controller 200 modifies the light (the image light 400L) of the display layer 423 by controlling the second drive unit 450 based on the acquired information. For example, the second drive unit 450 causes the display layer 423 to form an image corresponding to the first operating state ST1. Or, the second drive unit 450 causes the display layer 423 to form an image corresponding to the second operating state ST2.

Thereby, the appropriate three-dimensional images can be provided according to the viewing direction (the rotation) in which the viewer 350 views the image display unit 400 when the viewer 350 rotates the image display device 500 to change the portrait/landscape disposition.

The information recited above relating to the viewing direction in which it is estimated that the viewer 350 views the image display unit 400 can be obtained by any method.

For example, as illustrated in FIG. 1, a second sensor 320 may be provided as the sensor 300. For example, the second sensor 320 senses the direction, with respect to a reference axis, of the extension direction of at least one selected from a side of the image display unit 400 and a side (e.g., the first side 11, etc.) included in the liquid crystal optical device. For example, at least one selected from gravity and the earth's axis may be used as the reference axis.

Then, the second sensor 320 generates the information relating to the viewing direction estimated when the viewer 350 views the image display unit 400 based on the sensed direction (the direction with respect to the reference axis of the extension direction of the side of the image display unit 400). For example, in many cases, the viewer 350 views the image display device 500 in a state in which the two eyes of the viewer 350 intersect (e.g., are orthogonal to) gravity. Therefore, the information relating to the viewing direction estimated when the viewer 350 views the image display unit 400 can be generated by sensing the direction of the side included in the image display device 500 (i.e., the image display unit 400) using the direction of gravity as the reference.

Continuing, the second sensor 320 supplies the generated information to the controller 200. In such a case as well, the controller 200 causes the first drive unit 150 to implement at least one selected from the first operation and the second operation based on the acquired information. Then, the controller 200 modifies the light (the image light 400L) of the display layer 423 by controlling the second drive unit 450 based on the acquired information.

For example, at least one selected from a camera and a distance sensor may be used as the first sensor 310. For example, at least one selected from a gravitational acceleration sensor and a distance sensor may be used as the second sensor 320.

The first drive unit 150 may be included in the liquid crystal optical device. The first drive unit 150 may be included in the image display unit 400. At least one selected from the first drive unit 150 and the second drive unit 450 may be included in the controller 200. The sensor 300 (e.g., the first sensor 310, the second sensor 320, etc.) may be included in the controller 200.

For example, the controller 200 may be included in the liquid crystal optical device. Also, the sensor 300 (e.g., the first sensor 310, the second sensor 320, etc.) may be included in the liquid crystal optical device. For example, the controller 200 acquires the information relating to the rotation of the first substrate unit 10u around the Z-axis direction (the direction perpendicular to the X-Y plane). The controller 200 causes the first drive unit 150 to implement at least one selected from the first operation and the second operation based on the acquired information.

Thus, by using the controller 200 and the sensor 300, an appropriate image can be provided to match the rotation when the image display unit 400 and the liquid crystal optical device are rotated around the Z axis or when the viewer 350 rotates the viewing direction.

Figure 16A:
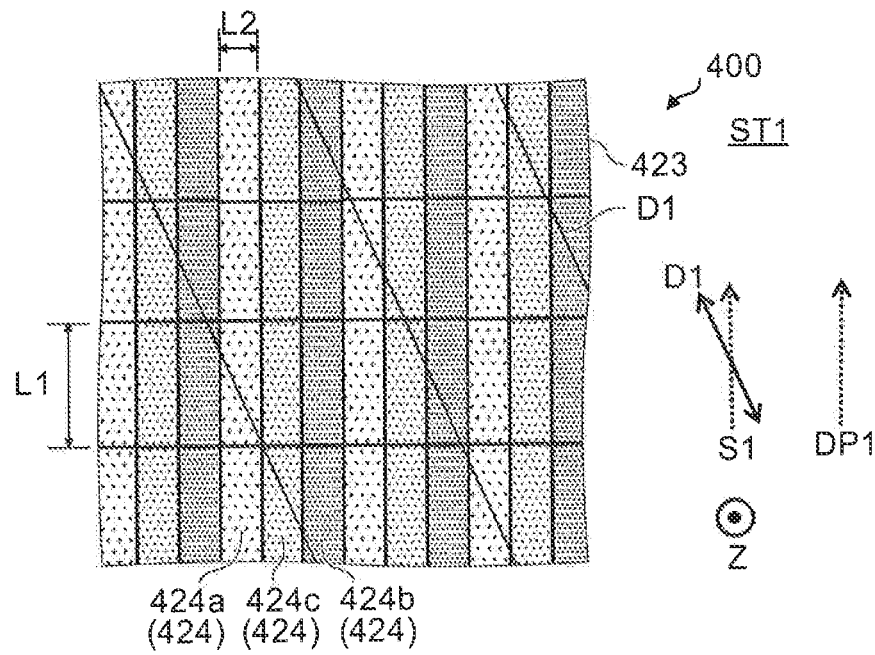
FIG. 16A and FIG. 16B are schematic views showing image display device according to the second embodiment.
Figure 16B:
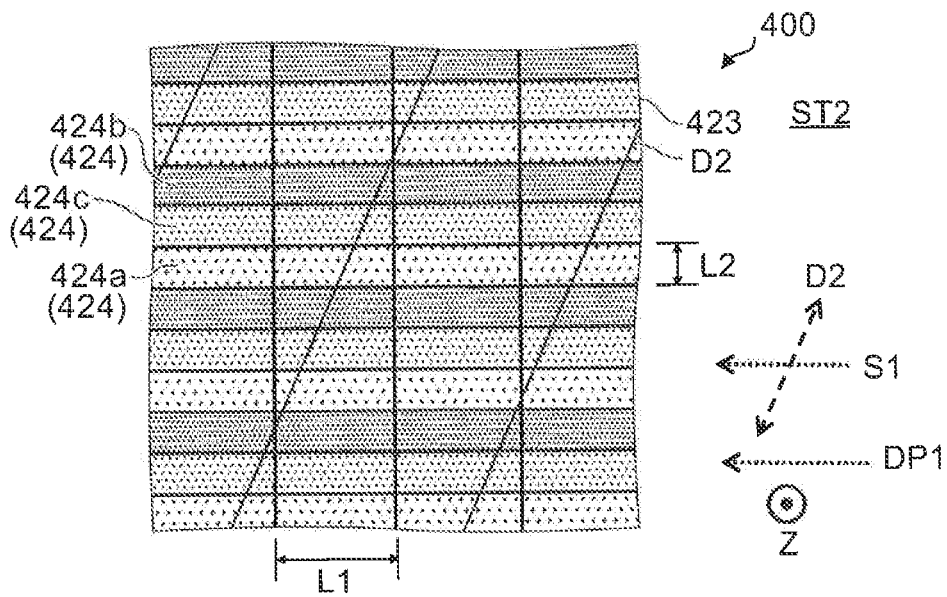

FIG. 16A and FIG. 16B are schematic views illustrating image display device according to the second embodiment.

These drawings are schematic views illustrating the image display unit 400 of the image display device 500. These drawings respectively illustrate the mutually-different states of the portrait and landscape dispositions of the image display device 500. The portrait/landscape disposition of the image display device 500 is rotated around the Z-axis direction between these states. In the example, the angle of the rotation is 90 degrees. FIG. 16A corresponds to, for example, the first operating state ST1. FIG. 16B corresponds to the second operating state ST2.

As shown in FIG. 16A, the image display unit 400 includes multiple pixels 424. The multiple pixels 424 are disposed in a plane (the X-Y plane) parallel to the Z-axis direction. As described above, the X-Y plane is parallel to the first surface 10*a*.

The pixels 424 are provided, for example, in the display layer 423. The image is formed by modulating the intensity of the light emitted from each of the multiple pixels 424.

In the example, the multiple pixels 424 include multiple first pixels 424*a*, multiple second pixels 424*b*, and multiple third pixels 424*c*.

The first pixels 424*a* are capable of emitting a first light having a first peak wavelength. The second pixels 424*b* are capable of emitting a second light having a second peak wavelength. The second peak wavelength is different from the first peak wavelength. The third pixels 424*c* are capable of emitting a third light having a third peak wavelength. The third peak wavelength is different from the first peak wavelength and different from the second peak wavelength. The first light is, for example, red light; the second light is, for example, green light; and the third light is, for example, blue. The colors of the first to third lights are mutually interchangeable.

For example, one of the first pixels 424*a*, one of the second pixels 424*b*, and one of the third pixels 424*c* may be used as one display component. The first to third pixels 424*a* to 424*c* are, for example, a subpixel.

For example, the length of the pixel 424 in the vertical direction is different from the length of the pixel 424 in the horizontal direction.

For example, one direction that is in the X-Y plane (the plane parallel to the first surface 10*a*) is taken as a first pixel direction DP1. The first pixel direction DP1 intersects the first direction D1 and intersects the second direction D2. For example, the first pixel direction DP1 is parallel to the first side direction S1. A direction that is perpendicular to the first pixel direction DP1 in the X-Y plane (the plane parallel to the first surface 10*a*) is taken as a second pixel direction DP2. The second pixel direction DP2 intersects the first direction D1 and intersects the second direction D2.

A first length L1 of each of the multiple pixels 424 along the first pixel direction DP1 is different from a second length L2 of each of the multiple pixels 424 along the second pixel direction DP2. In the example, the first length L1 is longer than the second length L2.

For example, the length of one display component in the vertical direction is substantially equal to the length of the one display component in the horizontal direction. In the case where the three pixels 424 (the first to third pixels 424*a* to 424*c*) are included in the one display component, for example, the first length L1 is substantially about three times the second length L2. For example, the first length L1 is not less than 2.5 times and not more than 3.5 times the second length L2. Thereby, the difference between the length in the vertical direction and the length in the horizontal direction for the one display component can be small; and it is easy to set the vertical:horizontal ratio of the display object to the desired value.

The configuration of each of the pixels 424 is, for example, a rectangle. The configuration of each of the pixels 424 is arbitrary. For convenience, the first length L1 may be the pitch of the multiple pixels 424 in the first pixel direction DP1. For convenience, the second length L2 may be the pitch of the multiple pixels 424 in the second pixel direction DP2.

Light of mutually-different colors is emitted from the pixels 424. In the case where the pixels 424 respectively include, for example, light emitting layers (e.g., organic light emitting layers) that emit light of mutually-different colors, the different light emitting layers respectively correspond to the pixels 424. In the case where color filters of different colors are provided, the color filters of the different colors respectively correspond to the pixels 424.

Thus, in the example, the multiple pixels 424 are provided; and the configurations of the multiple pixels 424 are anisotropic. In other words, the first length L1 of the pixel 424 in one direction (the first pixel direction DP1) is different from the second length L2 of the pixel 424 in one other direction (the second pixel direction DP2). The image display unit 400 that includes such pixels 424 is combined with the liquid crystal optical device according to the embodiment. Then, the first operating state ST1 is provided.

In the embodiment, the first direction D1 intersects the extension direction (i.e., the first pixel direction DP1) of the pixel 424 having the anisotropic configuration. Thereby, the occurrence of moiré between the liquid crystal optical device and the multiple pixels 424 is suppressed. In other words, moiré in the first operating state ST1 can be suppressed.

On the other hand, as shown in FIG. 16B, the image display device 500 is rotated; and the second operating state ST2 is provided. In the embodiment at this time, the second direction D2 intersects the extension direction (i.e., the first pixel direction DP1) of the pixel 424 having the anisotropic configuration. Thereby, the occurrence of moiré between the liquid crystal optical device and the multiple pixels 424 is suppressed. In other words, moiré in the second operating state ST2 also can be suppressed.

Thus, when viewed by the user, the extension direction of the pixels 424 having the anisotropic configuration is different between the first operating state ST1 and the second operating state ST2. In other words, in the example, the extension direction of the pixels 424 is the vertical direction in the first operating state ST1. In other words, the pixels 424 have a portrait-disposition. On the other hand, the extension direction of the pixels 424 is the horizontal direction in the second operating state ST2. In other words, the pixels 424 have a landscape-disposition. According to the embodiment, moiré of such an image display device can be suppressed in both operating states.

For example, the first direction D1 is set to suppress moiré for the portrait-oriented pixels 424. On the other hand, the second direction D2 is set to suppress moiré for the landscape-oriented pixels 424.

As illustrated in FIG. 16A, for example, the multiple first pixels 424*a* are arranged along a straight line along the first pixel direction DP1. The multiple second pixels 424*b* also are arranged along the straight line along the first pixel direction DP1. The multiple third pixels 424*c* also are arranged along the straight line along the first pixel direction DP1. In other words, the first pixels 424*a*, the second pixels 424*b*, and the third pixels 424*c* have stripe configurations along the first pixel direction DP1. The image display unit 400 that includes the pixels 424 having such stripe configurations is combined with the liquid crystal optical device according to the embodiment. Thereby, the first direction D1 intersects the extension direction of the stripes. The second direction D2 also intersects the extension direction of the stripes. Thereby, moiré in both the first operating state ST1 and the second operating state ST2 can be suppressed.

For example, the first direction D1 is set to suppress moiré for the pixels 424 having the stripe configurations extending in the vertical direction. On the other hand, the second direction D2 is set to suppress moiré for the pixels 424 having the stripe configurations extending in the horizontal direction.

Third Embodiment

Figure 17:
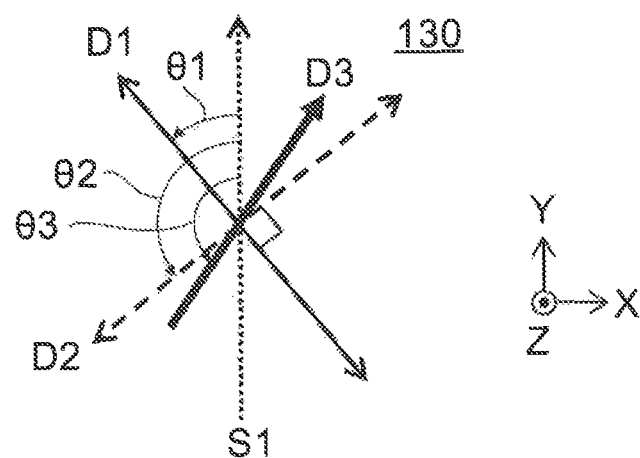
FIG. 17 is a schematic view showing a liquid crystal optical device according to a third embodiment.

FIG. 17 is a schematic view illustrating a liquid crystal optical device according to a third embodiment.

FIG. 17 illustrates the first direction D1, the second direction D2, and the third direction D3 of the liquid crystal optical device 130 according to the embodiment. Other than the relationships between these directions, the configuration of the liquid crystal optical device 130 may be similar to that of the liquid crystal optical device 110; and a description is therefore omitted. The liquid crystal optical device 130 also may be combined with the image display unit 400 to be used as an image display device.

In the example as shown in FIG. 17, the second direction D2 is orthogonal to the first direction D1. In such a case as well, the first angle θ1 in the first rotation direction from the first side direction S1 to the first direction D1 is less than 90 degrees and more than 0 degrees. In the example, the absolute value of the difference between the second angle θ2 and the first angle θ1 is 90 degrees.

The third angle θ3 is different from the first angle θ1 and different from the second angle θ2.

According to the liquid crystal optical device 130 having such a configuration, it is possible to obtain and switch between the refractive index distribution in the direction D1a orthogonal to the first direction D1 and the refractive index distribution in the direction D2a orthogonal to the second direction D2. Thereby, a liquid crystal optical device and an image display device that are easier to use are obtained.

For example, the angle between the third direction D3 and the first direction D1 may be about 45 degrees (not less than 42 degrees and not more than 48 degrees). For example, the absolute value of the difference between the third angle θ3 (degrees) and the first angle θ1 (degrees) is, for example, about 45 degrees (not less than 42 degrees and not more than 48 degrees). Or, for example, the absolute value of the difference between the third angle θ3 (degrees) and the first angle θ1 (degrees) may be, for example, about 135 degrees (not less than 132 degrees and not more than 138 degrees). By such a configuration, a lens having good characteristics can be formed in both the first operating state ST1 and the second operating state ST2. Also, good viewing angle characteristics are obtained in both operating states.

In the embodiment, it is favorable for the first angle θ1 to be set to be not less than 5 degrees and not more than 40 degrees. Thereby, a lens having good characteristics can be formed easily in both the first operating state ST1 and the second operating state ST2.

The third embodiment and the second embodiment may be implemented in combination.

In the embodiment, the absolute value of the difference between the second angle θ2 and the first angle θ1 may not be 90 degrees. In such a case as well, for example, the first angle θ1 is more than 0 degrees and not more than 45 degrees; and the second angle θ2 is less than 90 degrees and more than 45 degrees. A liquid crystal optical device and an image display device that are easier to use can be provided by combining such a liquid crystal optical device with the first drive unit 150 recited above that is capable of the first operation and the second operation recited above.

Fourth Embodiment

Figures 18A, 18B:
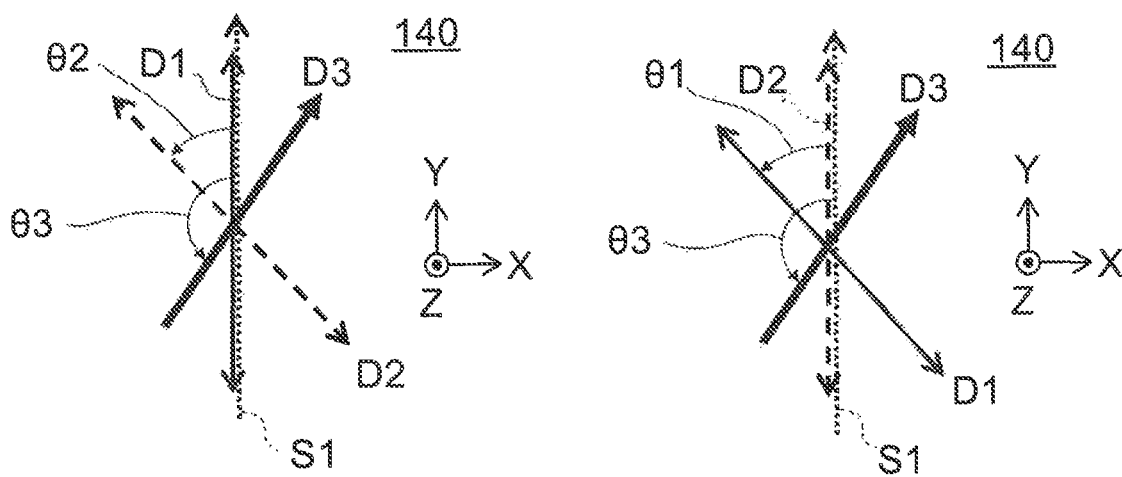
FIG. 18A and FIG. 18B are schematic views showing liquid crystal optical devices according to a fourth embodiment.

FIG. 18A and FIG. 18B are schematic views illustrating liquid crystal optical devices according to a fourth embodiment.

FIG. 18A and FIG. 18B illustrate the first direction D1, the second direction D2, and the third direction D3 for the liquid crystal optical devices 140 and 141, respectively, according to the embodiment. Other than the relationships between these directions, the configurations of the liquid crystal optical devices 140 and 141 may be similar to that of the liquid crystal optical device 110; and a description is therefore omitted. Also, the liquid crystal optical devices 140 and 141 may be combined with the image display unit 400 to be used as image display devices.

In the liquid crystal optical device 140 as shown in FIG. 18A, the first direction D1 is parallel to the first side direction S1. In other words, the first angle θ1 is 0. The second direction D2 intersects the first direction D1. Also, the third direction D3 intersects the first direction D1 and the second direction D2. In such a case, it is favorable for the second angle θ2 to be not less than 5 degrees and not more than 70 degrees. It is favorable for the third angle θ3 to be not less than 30 degrees and not more than 150 degrees.

In the liquid crystal optical device 141 as shown in FIG. 18B, the second direction D2 is parallel to the first side direction S1. In other words, the second angle θ2 is 0. The first direction D1 intersects the second direction D2. Also, the third direction D3 intersects the first direction D1 and the second direction D2. In such a case, it is favorable for the first angle θ1 to be not less than 5 degrees and not more than 70 degrees. It is favorable for the third angle θ3 to be not less than 30 degrees and not more than 150 degrees.

In the liquid crystal optical devices 140 and 141 having such configurations as well, it is possible to obtain and switch between the refractive index distribution in the direction D1a orthogonal to the first direction D1 and the refractive index distribution in the direction D2a orthogonal to the second direction D2. Thereby, a liquid crystal optical device and an image display device that are easier to use are obtained.

The fourth embodiment and the second embodiment may be implemented in combination.

According to the embodiments, a liquid crystal optical device and an image display device that are easier to use can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the liquid crystal optical device such as the substrate unit, the substrate, the electrode, the alignment film, the liquid crystal layer, the liquid crystal molecules, and the first drive unit, specific configurations of components included in the image display device such as the image display unit, the display layer, the second drive unit, the controller, the sensor, etc., from known art; and such practice is within the scope of the invention to the extent that similar effects are obtained.

Further, any two or more components of the specific examples may be combined within the extent of technical feasibility and are within the scope of the invention to the extent that the spirit of the invention is included.

Moreover, all liquid crystal optical display devices and image display devices practicable by an appropriate design modification by one skilled in the art based on the liquid crystal display devices and image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical device, comprising:
   a first substrate unit including
      a first substrate having a first surface and a first side, the first side extending in a first side direction when projected onto a plane parallel to the first surface, the first substrate being light-transmissive, and
      a plurality of first straight-line electrodes provided on the first surface to extend in a first direction when projected onto the plane, the first straight-line electrodes being separated from each other in a direction intersecting the first direction;
   a second substrate unit including
      a second substrate having a second surface opposing the first surface, the second substrate being light-transmissive, and
      a plurality of second straight-line electrodes provided on the second surface to extend in a second direction when projected onto the plane, the second straight-line electrodes being separated from each other in a direction intersecting the second direction, the second direction being inclined with respect to the first direction, an angle between the first direction and the second direction being less than 90 degrees and more than 0 degrees; and
   a liquid crystal layer including liquid crystal molecules provided between the first substrate unit and the second substrate unit, a long axis of the liquid crystal molecules being aligned in a third direction when projected onto the plane,
   wherein
   the first side direction and the first direction form a first angle $\theta 1$ in a first rotation direction, the first angle being less than 90 degrees and more than 0 degrees,
   the first side direction and the second direction form a second angle $\theta 2$ in the first rotation direction, the second angle being different from the first angle, and being less than 90 degrees and more than 0 degrees,
   the first side direction and the third direction form a third angle $\theta 3$ in the first rotation direction, the third angle being different from the first angle and different from the second angle.

2. The device according to claim 1, wherein the third angle is larger than the first angle and larger than the second angle.

3. The device according to claim 1, wherein the first angle $\theta 1$, the second angle $\theta 2$, and the third angle $\theta 3$ satisfy $$(\theta 1+\theta 2)/2+70 \text{ degrees} \leq \theta 3 \leq (\theta 1+\theta 2)/2+110 \text{ degrees}.$$

4. The device according to claim 1, wherein
   the third direction of the liquid crystal molecules of the liquid crystal layer includes a first alignment direction of a first substrate side portion of the liquid crystal layer contacting the first substrate unit, and a second alignment direction of a second substrate side portion of the liquid crystal layer contacting the second substrate unit, and
   an absolute value of an angle between the first alignment direction and the second alignment direction is less than 3 degrees.

5. The device according to claim 1, wherein
   the third direction of the liquid crystal molecules of the liquid crystal layer includes a first alignment direction of a first substrate side portion of the liquid crystal layer contacting the first substrate unit, and a second alignment direction of a second substrate side portion of the liquid crystal layer contacting the second substrate unit,
   an absolute value of an angle between the first alignment direction and the second alignment direction is not less than 3 degrees, and
   the third direction of the liquid crystal molecules of the liquid crystal layer twists along a direction perpendicular to the first direction and the second direction.

6. The device according to claim 1, wherein
   the first side has a first end and a second end separated from the first end along the first side direction, and the first substrate further has a second side, a third side, and a fourth side,
   the second side is separated from the first side and extending in the first side direction, the second side has a third end and a fourth end, and the fourth end of the second side is separated from the third end of the second side along the first side direction,
   the third side is connected to the first end of the first side and the third end of the second side, and the third side extends in the direction perpendicular to the first side direction, and
   the fourth side is connected to the second end of the first side and the fourth end of the second side, and the fourth side extends in the direction perpendicular to the first side direction and is separated from the third side in the first side direction.

7. The device according to claim 1, further comprising a drive unit electrically connected to the first electrodes and the second electrodes,
   the drive unit being configured to implement:
      a first operation of forming a first refractive index distribution in the liquid crystal layer along a direction perpendicular to the first direction by setting a voltage between the first electrodes and the second electrodes to be in a first state; and
      a second operation of forming a second refractive index distribution in the liquid crystal layer along a direction perpendicular to the second direction by setting the voltage between the first electrodes and the second electrodes to be in a second state.

8. The device according to claim 7, wherein the drive unit is configured to:
cause potentials of at least two of the first electrodes to be different from each other in the first operation; and
cause potentials of at least two of the second electrodes to be different from each other in the second operation.

9. The device according to claim 7, further comprising a controller,
the controller being configured to acquire information relating to a rotation of the first substrate unit around a direction perpendicular to the plane and cause the drive unit to implement at least one selected from the first operation and the second operation based on the acquired information.

10. The device according to claim 1, wherein an absolute value of a difference between the first angle and the third angle is not less than 87 degrees and not more than 93 degrees.

11. The device according to claim 1, wherein an absolute value of a difference between the first angle and the second angle is not more than 60 degrees.

12. The device according to claim 1, wherein an absolute value of a difference between the third angle and the first angle is not less than 20 degrees.

13. An image display device, comprising:
a liquid crystal optical device; and
an image display unit stacked with the liquid crystal optical device,
the liquid crystal optical device including:
a first substrate unit including
a first substrate having a first surface and a first side, the first side extending in a first side direction when projected onto a plane parallel to the first surface, the first substrate being light-transmissive, and
a plurality of first straight-line electrodes provided on the first surface to extend in a first direction when projected onto the plane, the first straight-line electrodes being separated from each other in a direction intersecting the first direction;
a second substrate unit including
a second substrate having a second surface opposing the first surface, the second substrate being light-transmissive, and
a plurality of second straight-line electrodes provided on the second surface to extend in a second direction when projected onto the plane, the second straight-line electrodes being separated from each other in a direction intersecting the second direction, the second direction being inclined with respect to the first direction, an angle between the first direction and the second direction being less than 90 degrees and more than 0 degrees; and
a liquid crystal layer including liquid crystal molecules provided between the first substrate unit and the second substrate unit, long axes of the liquid crystal molecules being aligned in a third direction when projected onto the plane,
wherein
the first side direction and the first direction form a first angle in a first rotation direction, the first angle being less than 90 degrees and more than 0 degrees,
the first side direction and the second direction form a second angle in the first rotation direction, the second angle being different from the first angle, and being less than 90 degrees and more than 0 degrees,
the first side direction and the third direction form a third angle in the first rotation direction, the third angle being different from the first angle and different from the second angle,
the image display unit being configured to cause light including image information to be incident on the liquid crystal layer.

14. The image display device according to claim 13, wherein the light including the image information includes polarized light, and a direction of a polarizing axis of the polarized light when projected onto the plane intersects the first direction and intersects the second direction.

15. The image display device according to claim 13, further comprising a controller,
the liquid crystal optical device further including a first drive unit electrically connected to the first electrodes and the second electrodes,
the first drive unit being configured to implement:
a first operation of forming a first refractive index distribution in the liquid crystal layer along a direction perpendicular to the first direction by setting a voltage between the first electrodes and the second electrodes to be in a first state; and
a second operation of forming a second refractive index distribution in the liquid crystal layer along a direction perpendicular to the second direction by setting the voltage between the first electrodes and the plurality of second electrodes to be in a second state,
the controller being configured to acquire information relating to a viewing direction estimated when the image display unit is viewed by a viewer and cause the first drive unit to implement at least one selected from the first operation and the second operation based on the acquired information, the light including the image information being incident on the viewer.

16. The image display device according to claim 15, further comprising a first sensor configured to sense the viewing direction of the image display unit by the viewer and supply information relating to the sensed viewing direction to the controller.

17. The image display device according to claim 15, further comprising a second sensor configured to sense a direction of an extension direction of at least one selected from a side included in the image display unit and a side included in the liquid crystal optical device with respect to a reference axis, generate the information relating to the viewing direction estimated when the viewer views the image display unit based on the sensed direction, and supply the generated information to the controller, the reference axis being at least one selected from gravity and earth's axis.

18. The image display device according to claim 15, wherein
the image display unit includes a display layer and a second drive unit connected to the display layer, the display layer being configured to form the light including the image information, and
the controller is configured to modify the light of the display layer by controlling the second drive unit based on the acquired information.

19. The image display device according to claim 15, wherein
the image display unit includes a plurality of pixels disposed in the plane parallel to the first surface, and
a first length of each of the pixels along a first pixel direction in the plane parallel to the first surface is different from a second length of each of the pixels along a second pixel direction perpendicular to the first pixel direction in the plane parallel to the first surface.

20. The image display device according to claim 19, wherein
the pixels include:
a plurality of first pixels capable of emitting a first light having a first peak wavelength; and
a plurality of second pixels capable of emitting a second light having a second peak wavelength different from the first peak wavelength,
the first pixels being arranged along a straight line along the first pixel direction, and
the second pixels being arranged along the straight line along the first pixel direction.

\* \* \* \* \*